US00RE45317E

(19) United States
(12) Reissued Patent
Weimer et al.

(10) Patent Number: US RE45,317 E
(45) Date of Reissued Patent: Jan. 6, 2015

(54) RAPID SOLAR-THERMAL CONVERSION OF BIOMASS TO SYNGAS

(71) Applicant: The Regents of the University of Colorado, Denver, CO (US)

(72) Inventors: Alan W. Weimer, Niwot, CO (US); Christopher Perkins, Boulder, CO (US); Dragan Mejic, Brighton, CO (US); Paul Lichty, Boulder, CO (US)

(73) Assignee: The Regents of the University of Colorado, Denver, CO (US)

(21) Appl. No.: 13/855,617

(22) Filed: Apr. 2, 2013

Related U.S. Patent Documents

Reissue of:
(64) Patent No.: 8,287,610
Issued: Oct. 16, 2012
Appl. No.: 11/847,097
Filed: Aug. 29, 2007

U.S. Applications:
(60) Provisional application No. 60/823,872, filed on Aug. 29, 2006.

(51) Int. Cl.
*B01J 7/00* (2006.01)
*C01B 3/36* (2006.01)
*C01B 6/24* (2006.01)

(52) U.S. Cl.
USPC ..... 48/197 R; 48/61; 48/210; 423/644

(58) Field of Classification Search
USPC ..... 48/61, 197 R, 210; 423/644
See application file for complete search history.

(56) References Cited

U.S. PATENT DOCUMENTS

| | | | | | |
|---|---|---|---|---|---|
| 3,855,339 | A | * | 12/1974 | Hosoi et al. | 208/130 |
| 4,177,120 | A | | 12/1979 | Zenty | 204/157.47 |
| 4,229,184 | A | | 10/1980 | Gregg | 48/62 R |
| 4,290,779 | A | * | 9/1981 | Frosch et al. | 422/186 |
| 4,415,339 | A | | 11/1983 | Aiman et al. | 48/62 R |
| 4,455,153 | A | | 6/1984 | Jakahi | 48/62 R |

(Continued)

FOREIGN PATENT DOCUMENTS

| | | | |
|---|---|---|---|
| EP | 548889 | A1 * | 6/1993 |
| EP | 0 548 889 | A1 | 9/1993 |

(Continued)

OTHER PUBLICATIONS

Hebecker, D., P. Bittrich, and K. Riedl, Hierarchically structured exergetic and exergoeconomic analysis and evaluation of energhy converson processes. Energy Conversion and Management, 2005. 46:p. 1247-1266.*

(Continued)

*Primary Examiner* — Matthew Merkling
(74) *Attorney, Agent, or Firm* — Snell & Wilmer L.L.P.

(57) ABSTRACT

Methods for carrying out high temperature reactions such as biomass pyrolysis or gasification using solar energy. The biomass particles are rapidly heated in a solar thermal entrainment reactor. The residence time of the particles in the reactor can be 5 seconds or less. The biomass particles may be directly or indirectly heated depending on the reactor design. Metal oxide particles can be fed into the reactor concurrently with the biomass particles, allowing carbothermic reduction of the metal oxide particles by biomass pyrolysis products. The reduced metal oxide particles can be reacted with steam to produce hydrogen in a subsequent process step.

15 Claims, 14 Drawing Sheets

(56) References Cited

U.S. PATENT DOCUMENTS

| | | | | |
|---|---|---|---|---|
| 4,497,637 | A | 2/1985 | Purdy et al. | 48/111 |
| 4,531,949 | A * | 7/1985 | Koyama et al. | 48/202 |
| 5,647,877 | A | 7/1997 | Epstein | 48/210 |
| 6,033,447 | A * | 3/2000 | Moock et al. | 48/197 R |
| 6,298,651 | B1 * | 10/2001 | Iijima | 60/780 |
| 6,633,042 | B1 | 10/2003 | Funken et al. | 250/435 |
| 6,872,378 | B2 | 3/2005 | Weimer et al. | 423/650 |
| 7,033,570 | B2 | 4/2006 | Weimer et al. | 423/650 |
| 2003/0182861 | A1 * | 10/2003 | Weimer et al. | 48/197 R |
| 2006/0013765 | A1 | 1/2006 | Litwin et al. | 423/652 |
| 2006/0188433 | A1 | 8/2006 | Weimer et al. | 423/622 |
| 2006/0211777 | A1 | 9/2006 | Severinsky | 518/702 |
| 2009/0313886 | A1 * | 12/2009 | Hinman et al. | 44/302 |
| 2010/0000874 | A1 * | 1/2010 | Hinman et al. | 205/340 |

FOREIGN PATENT DOCUMENTS

| | | | |
|---|---|---|---|
| GB | 2 073 869 | A1 | 10/1981 |
| GB | 2073869 | A * | 10/1981 |
| GB | 2414243 | A | 11/2005 |
| WO | WO 0209876 | A1 * | 2/2002 |
| WO | WO 0222497 | A1 * | 3/2002 |
| WO | WO 2005087986 | A1 * | 9/2005 |
| WO | WO 2005-103329 | A3 | 11/2005 |
| WO | WO 2005/113859 | A3 | 12/2005 |
| WO | WO 2005103329 | A3 * | 8/2006 |
| WO | WO 2005113859 | A3 * | 4/2007 |
| WO | WO 2007/066087 | A3 | 6/2007 |
| WO | WO 2007066087 | A3 * | 1/2008 |
| WO | WO 2008027980 | A1 * | 3/2008 |

OTHER PUBLICATIONS

Steinfeld, A., S. Sanders, and R. Palumbo, Design aspects of solar thermochemical engineering—A case study: Two step water-splitting cycle using the Fe3O4/FeO redox system. Solar Energy, 1999 65(1): p. 43-53.*

Perkins, C., P. Lichty, and A.Weimer, Thermal ZnO dissociation in a rapid aerosol reactor as part of a solar hydrogen production cycle. International Journal of Hydrogen Energy, 2008. 33(2): p. 499-510.*

Perkins, C., P. Lichty, and A.W. Weimer, Determination of aerosol kinetics of thermal ZnO dissociation by thermogravimetry, Chemical Engineering Science, 2007. 62(21): p. 5952-5962.*

Dahl, J., et al. Solar thermal dissociation of methane in a fluid-wall aerosol flow reactor. International Journal of Hydrogen Energy, 2004. 29(7): p. 725-736.*

Dahl, J.K. et al., Intrisic kinetics for rapid decomposition of methane in an aerosol flow reactor. International Journal of Hydrogen Energy, 2002. 27(4): p. 377-386.*

Dahl, J.K. et al., Rapid solar-thermal dissociation of natural gas in an aerosol flow reactor. Energy, 2004. 29(5-6): p. 715-725.*

Dahl, J.K. et al., Solar-thermal processing of methane to produce hydrogen and syngas. Energy & Fuels, 2001. 15(5): p. 1227-1232.*

Dahl, J.K., A.W. Weimer, and W.B. Krantz, Sensitivity analysis of the rapid decomposition of methane in an aerosol flow reactor. International Journal of Hydrogen Energy, 2004. 29(1): p. 57-65.*

Dahl, J.K. Et al., Dry reforming of methane using a solar-thermal aerosol flow reactor. Industrial & Engineering Chemistry Research, 2004. 43(18): p. 5489-5495.*

Cross Reference to related Applications Under 37 C.F.R. § 1.78.*

U.S. Appl. No. 12/145,383, filed Jun. 24, 2008, Hinman et al.

U.S. Appl. No. 12/237,999, filed Sep. 25, 2008, Hinman et al.

Steinfeld, A., et al., *Solar Thermal Production of Zinc and Syngas Via Combined Zno-Reduction and Ch4-Reforming Process*. International Journal of Hydrogen Energy, 1995. 20(10): p. 793-804.

Steinfeld, A., et al., *Solar-processed metals as clean energy carriers and water-splitters*. International Journal of Hydrogen Energy, 1998. 23(9): p. 767-774.

International Preliminary Report on Patentability and Written Opinion, Application No. PCT/US07/77134, Mailed Jan. 16, 2008. 7 pages.

Weimer et al., "Modeling of Char Particle Size/Conversion Distributions in a Fluidized Bed Gasifier: Non-Isothermal Effects," Powder Technology, 1980, pp. 85-103, vol. 27, Elsevier Sequoia S.A., Lausanne, Netherlands.

Milne et al., "Biomass Gasifier "Tars": Their Nature, Formation, and Conversion," National Renewable Energy Laboratory, Nov. 1998, TP-570-25357.

Lichty et al., "Rapid High Temperature Solar Thermal Biomass Gasification in a Prototype Cavity Reactor," Journal of Solar Energy Engineering, Feb. 2010, pp. 011012-1 to 011012-7, vol. 132, ASME, published online.

Antal, M.J., et al. "Design and Operation of a Solar Fired Biomass Pyrolysis Reactor," Solar Energy, vol. 30, No. 4, 1983, pp. 299-312.

Australia Government (IP Australia) issued an Office Action dated Sep. 30, 2010 for related Australian Patent Application No. 2007/289219, entitled "Rapid Solar-Thermal Conversion of Biomass to Syngas," 3 pages.

Extended European Search Report, the supplementary European Search and European Search Opinion for European Application No. 07814538.0, dated May 20, 2011, 8 pages.

* cited by examiner

Figure 5 - Mass Spectrometer Trace for Cellulose Gasification

Figure 7 - Mass Spectrometry Trace for Cellulose Pyrolysis

Fig. 9: Mass spectrometer trace for solar gasification of cellulose

Fig. 10: Mass spectrometer trace for gasification of *Poa pratensis* (Kentucky bluegrass)

RAPID SOLAR-THERMAL CONVERSION OF BIOMASS TO SYNGAS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Application 60/823,872, filed Aug. 29, 2006, which is hereby incorporated by reference to the extent not inconsistent with the disclosure herein.

STATEMENT REGARDING FEDERALLY SPONSORED RESEARCH OR DEVELOPMENT

The invention was made with Government support from the National Science Foundation Graduate Research Fellowship program. The United States government may have certain rights in the invention.

BACKGROUND OF THE INVENTION

This invention is in the field of solar biomass gasification and pyrolysis

As processes, biomass gasification and pyrolysis have been known for a long time. Several different types of reactors have been used to gasify and/or pyrolize biomass including fixed bed reactors, fluidized bed reactors, and entrained flow reactors. A variety of sources of heat for biomass gasification and pyrolysis processes have been used, including fossil fuels (Ni, et al, Fuel Processing Technology, 2006, pp. 461-472) and combustion of biomass or biomass reaction products such as pyrolysis oil (e.g. U.S. Pat. No. 4,497,637 to Purdy et al).

Solar gasification of carbonaceous particles has also been reported in the patent literature. U.S. Pat. No. 5,647,877 to Epstein reports solar energy gasification of solid carbonaceous material in a liquid dispersion. An aqueous dispersion of carbonaceous material is introduced into the reactor so as to form water droplets enclosing particulates of the carbonaceous material. The solid carbonaceous material is heated by solar energy and transfers heat to a surrounding liquid. Hydrogen is produced in the process by the decomposition/gasification of the hydrocarbon (coal) particles. A variety of carbonaceous materials are mentioned as possible feedstocks including coal and various biomasses.

U.S. Pat. No. 4,290,779 to Frosch et al. reports a solar heated fluidized bed gasification system for gasifying carbonaceous material. Solar radiation is introduced into a refractory honeycomb shell which surrounds the fluidized bed reactor. Both coal and organic biomass materials are mentioned as possible powdered carbonaceous feedstocks.

U.S. Pat. No. 4,229,184 to Gregg reports an apparatus for using focused solar radiation to gasify coal and other carbonaceous materials. The solar radiation is directed down through a window onto the surface of a vertically moving bed of the carbonaceous material.

It has been shown that solar thermal reactors can achieve temperatures up to 2500 K (2227° C.). Temperatures even higher than this are achievable, but in those regimes materials and reradiation loss issues become major concerns. Solar thermal systems have been applied to the dissociation of methane (Dahl, et al., International Journal of Hydrogen Energy, 29, 2004) or ZnO (Perkins, et al., International Journal of Hydrogen Energy, 29, 2004; Steinfeld, Solar Energy, 78, 2005). Carbon has been used as reducing agents for ZnO (Müller, R, P Haeberling, and R Palumbo, "Further advances toward the development of a direct heating solar thermal chemical reactor for the thermal dissociation of ZnO(s)," Solar Energy, 80, 2005, pp. 500-511).

BRIEF SUMMARY OF THE INVENTION

The invention provides processes that perform biomass gasification or pyrolysis for production of hydrogen, synthesis gas, liquid fuels, or other hydrocarbon based chemicals. The methods of the invention use solar thermal energy as the energy source for the biomass pyrolysis or gasification. This allows operation at temperatures above 950° C., speeding up reaction kinetics and shifting thermodynamics to various reaction end products, thus, bypassing the formation of tars and other liquids that have a tendency to cause plugging or increased pressure drop in gas/solid filtration devices downstream of the reactor and which are undesired side products. The increase in reaction rate, the use of a renewable energy resource, the avoidance of tars, and the wider range of available thermodynamic regimes give great advantage to one who would utilize solar thermal energy. Usage of solar thermal energy can reduce the overall amount of biomass required to produce the product chemicals, allows for a greater range of product control, does not rely on fossil fuel usage, and takes advantage of a freely available resource (solar energy).

In the methods of the invention, an entrainment flow solar-thermal reactor is used to carry out the high temperature thermal dissociation reactions, thereby permitting rapid-heating of the biomass particles and short residence times of the particles in the reactor. Rapid heating is of great advantage for this solar chemistry. Rapidly heating to high temperature (>950° C.) prevents the biomass particles from spending significant portions of time in temperature regimes (200° C.-800° C.) where formation of liquid side products and tars is favorable. The selectivity of the reactor toward desired products is thus increased. Likewise, rapid heating allows the particles to spend the most time possible in the temperature regimes where reaction rates are fastest (950° C. to 1400° C.). A rapid reaction allows the thermal energy imparted to the particles to be converted to chemical energy more quickly, reducing the portion of incident energy lost to re-radiation or conduction and increasing reactor efficiency. Additionally, a more rapid reaction leads to shorter effective residence times and higher reactor throughput; essentially, the production rates of fuels can be increased while leaving the area of solar concentrators constant. In different embodiments, the residence time is less than or equal to 5 seconds or less than or equal to 3 seconds. In an embodiment, the heating rate of the particles is greater than 100° C./s; preferably, this heating rate is greater than 1000° C./s.

The present invention also provides a method for carrying out a closed thermochemical/photosynthetic cycle for splitting water to produce hydrogen. A biomass feedstock such as algae can be grown in a controlled atmosphere greenhouse environment with algae receiving direct sunlight and being fed water and carbon dioxide and releasing oxygen to the environment via photosynthesis. The algae can be cultivated and fed as a biomass reactant to the reactor described herein. The algae can be pyrolyzed by high temperature solar thermal heating as described herein. The resulting "syngas" of carbon monoxide and hydrogen can be fed to a conventional "water-gas shift reactor" where water is fed and hydrogen and carbon dioxide are produced via a controlled catalytic process ($CO+H_2O \rightarrow H_2+CO_2$). The exiting gas is primarily $H_2$ and $CO_2$ which can be separated by conventional membrane or pressure swing adsorption processing. The $H_2$ can be used as a reactant or a fuel while the $CO_2$ is fed to the algae in the greenhouse. Water is effectively split to $H_2$ and $O_2$ via a combined solar thermochemical/photosynthetic process in two separate steps.

The present invention also provides processes which involve reduction of metal oxide particles with biomass pyrolysis products in a solar-thermal reactor. The invention also provides "renewable" hydrogen producing processes in which the hydrogen produced from reaction of the reduced metal oxide products with water is combined with hydrogen produced by reaction of gaseous products of the solar thermal reactor in a water-gas shift reactor, both processes being as described in Example 6 and elsewhere in this application. The invention also provides processes in which hydrogen produced by the methods of the invention are combined with conventional fossil feeds. For example, hydrogen can be combined with coal to produce methane as described in Example 7. Such a process represents a transitional bridge to a truly hydrogen economy.

DETAILED DESCRIPTION OF THE INVENTION

Figure 1:
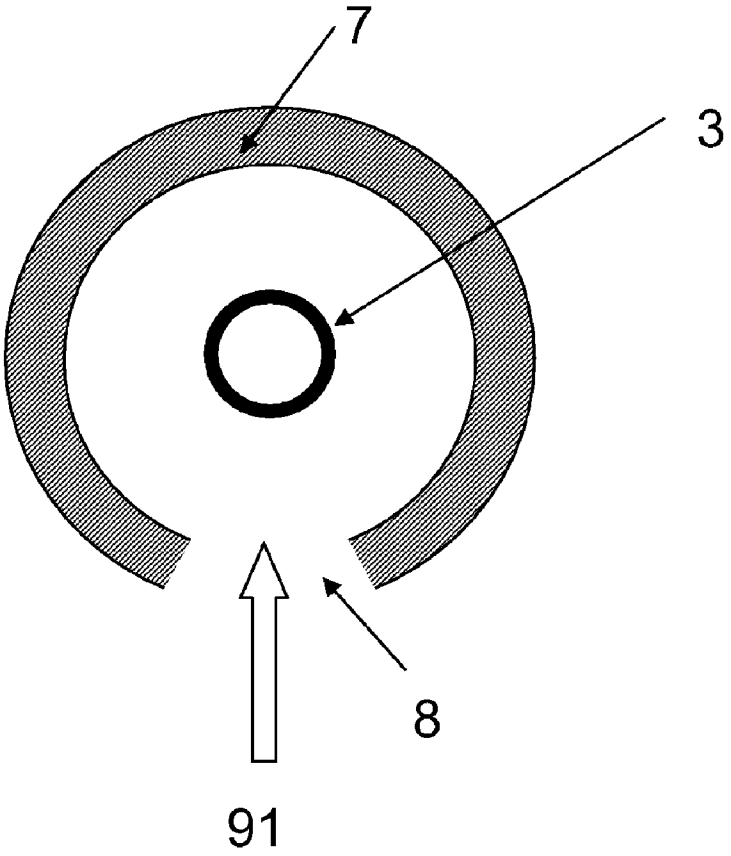
FIG. 1 is a schematic horizontal cross-section of a solar reactor having a single nonporous inner reaction shell and an outer protection shell, viewed from the top of the reactor.

In the processes of the invention, a solid or liquid biomass feed is pyrolyzed or gasified in a solar thermal reactor system at elevated temperatures. In different embodiments of the pyrolyzation processes of the invention, no significant source of oxygen or water is supplied during the process. An oxidizing agent is conventionally present in gasification processes. In the gasification processes of the invention, water (generally in the form of steam) is supplied and contacted with the biomass particles.

In an embodiment, the biomass feed is in the form of solid particles. The biomass feed particles or droplets are entrained in a gas as they move through the reactor. In an embodiment, metal oxide particles are fed into the reactor concurrently with biomass particles. In another embodiment particles of a fossil fuel such as coal are fed into the reactor concurrently with biomass particles. In an embodiment, no additional catalyst is added to the biomass feed.

The necessary endothermic heat of reaction and sensible heat is supplied by a solar-thermal energy system. The biomass particles or droplets may be directly heated by solar radiation, in which case the reactor is configured to transmit solar radiation to the particles. In another embodiment, the biomass particles or droplets are indirectly heated. As used herein, "indirect" heating means that the heating is by radiation from a heated wall that is itself heated indirectly or directly by solar radiation.

In an embodiment, the pyrolysis and gasification processes of the invention produce hydrogen and carbon monoxide (synthesis gas or syngas). Other products such as carbon dioxide, carbon, methane and higher molecular weight hydrocarbons may also be produced in the process. In different embodiments, the conversion of the non-ash components of the biomass is greater 30%, greater than or equal to 40%, greater than 50%, greater than or equal to 60%, greater than or equal to 70%, greater than or equal to 75% greater than 80%, greater than 90% or greater than 95%. This extent of conversion may be achieved in a single pass. In different embodiments, the conversion of carbon to carbon monoxide is greater than 30%, greater than 40%, greater than 50%, greater than 60%, greater than 70%, greater than 80%, greater than 90% or greater than 95%. In different embodiments, the molar ratio of carbon dioxide to carbon monoxide is less than 25% or less than 10%. In different embodiments, the molar ratio of hydrogen ($H_2$) to carbon monoxide is 1:1, greater than 1:1 and less than 2:1; less than 2:1; greater than 2:1 and less than 3:1; or greater than 3:1. The ratio of hydrogen to carbon monoxide may be adjusted by adjusting the amount of water added to the feed.

The products of the biomass pyrolyzation or gasification process can be combined in a Fischer-Tropsch reactor to produce liquid hydrocarbon products, or can be reacted further with water in a Water-Gas Shift reaction to maximize hydrogen yield. Such a process makes use of renewable, biologically derived feedstocks and is, in a worst case, carbon and greenhouse gas neutral.

As stated above, the invention provides a chemical process in which carbon containing biomass feedstocks (for example, but not limited to, cellulose, hemi-cellulose, lignin, xylose, other plant sugars, algae, agricultural, industrial, brewery, or forestry residues) are either pyrolized or combined with water at high temperature (>950° C.). In different embodiments, the biomass feedstock may be a tall prairie grass, such as switchgrass and/or miscanthus, algae, pressed algal residue from a biodiesal processing facility, spent grain from a brewery, wood chips, or sawdust. In an embodiment, feedstocks for use with the invention do not include mixtures of coal and biomass. In another embodiment particles of a fossil fuel such as coal are fed into the reactor concurrently with biomass particles. In one aspect of the invention, the biomass feedstock is selected to have an ash content less than about 15%, less than about 10% or less than about 5%.

In different embodiments, the maximum particle size of the biomass feedstock is less than 10 mm, less than 5 mm, less than 1 mm, less than 500 microns, less than 200 microns, less than 100 microns, less than 50 microns, or less than 20 microns. In an embodiment, the minimum "average" size of the biomass feedstock is 10 microns, as identified by the volume average equivalent spherical particle diameter or as the volume average of the longest particle dimension (if the particles are long and flat, like blades of grass). There may be smaller particles in the system (e.g. submicron), but on a mass basis these particles will be a very small fraction (in an embodiment <5 vol %) of the total.

The reactor product composition can be thermodynamically and kinetically controlled by reactor temperature, pressure, residence time, water concentration, feedstock concentration, and inert gas concentration, in addition to reactor design, solar energy concentration, and other factors not mentioned here. In different embodiments, the temperature in the hot zone of the reactor is between 750° C. and 1500° C., between 950° C. and 1400° C., or between 1100° C. and 1350° C., where the temperature is the average temperature of the particles in the reaction hot zone. The necessary energy to attain such temperatures and achieve the reaction is, in all cases, derived from a system which converts solar radiation into thermal energy ("solar-thermal").

In an embodiment, the reactor operates at atmospheric pressure. In another embodiment, the reactor can be run at pressures above atmospheric pressure, but this will drive the thermodynamics toward the liquid products and the reactants. In this embodiment, the compressors can be removed from the downstream side of the reactor and replaced with water pumps.

During the biomass gasification processes of the invention, the water concentration provides at least a one to one molar ratio of steam to biomass feed. In an embodiment, the water concentration may be increased slightly to compensate for a relatively high carbon to oxygen atomic ratio in the feedstock.

In an embodiment, the invention provides a method for at least partially converting biomass particles to hydrogen and carbon monoxide, the method comprising the steps of:

a) providing a solar-thermal reactor comprising an outer protection shell and an inner reaction shell having an inlet and an outlet, the outer protection shell being at least partially transparent or having an opening to the atmosphere for transmission of solar energy, b) flowing a gas stream comprising entrained biomass particles from the inlet to the outlet of the reaction shell; and c) heating the biomass particles in the reactor at least in part with a source of concentrated sunlight through solar thermal heating to a temperature at which the biomass particles react to form products comprising hydrogen and carbon monoxide.

The invention also provides methods for at least partially converting the biomass particles to other products in addition to hydrogen and carbon monoxide. These other products include, but are not limited to, carbon and carbon dioxide. In an embodiment, the biomass particles are at least partially converted to carbon, hydrogen, carbon monoxide, and carbon dioxide. In another embodiment, the biomass particles are at least partially converted to hydrogen, carbon monoxide, and carbon dioxide. In other embodiment the reaction products can include higher molecular weight hydrocarbons (e.g. $CH_4$, $C_2H_6$, $C_2H_4$, $C_2H_2$, $C_3$s, $C_4$s, etc), or hydrocarbons with oxygen bearing functional groups (e.g. alcohols, aldehydes).

FIG. 1 is a schematic top view of a horizontal cross-section of a solar reactor having an outer "protection shell" and a nonporous inner "reaction" shell. The solar reactor shown in FIG. 1 is operated generally as follows. Concentrated solar-thermal radiation (91) passes through an opening in the outer "protection" shell (7) and directly heats the inner "reaction" shell (3). In FIG. 1, the outer shell (7) is shown as having an opening (8) to the atmosphere, but in an alternative embodiment the outer shell contains a window which transmits solar radiation. In an embodiment, the inner surface of the outer shell may reflect solar radiation (in particular radiation in the visible range) and infrared radiation. In another embodiment, the inner surface is capable of absorbing and re-emitting radiation. The entrainment gas and the feedstock flow through the bore of the reaction shell.

In an embodiment, the inner "reaction" shell is at least partially transparent to solar radiation, in which case the biomass particles are directly heated by the solar-thermal radiation. In an embodiment, the inner shell is at least partially transparent to solar radiation in the wavelength range 200 nm to 20 microns. When heated, the biomass particles undergo the desired reaction(s).

In another embodiment, the inner "reaction" shell is nonporous and does not transmit solar radiation. In an embodiment, the inner shell does not transmit solar radiation in the wavelength range 200 nm to 20 microns. In this case, the nonporous reaction shell is directly heated to temperatures above the reaction temperature and re-radiates from its inner wall to heat the biomass particles and entraining gas stream flowing through it. The biomass particles are thus indirectly heated. When heated, the biomass particles undergo the desired reaction(s).

Figure 2B:
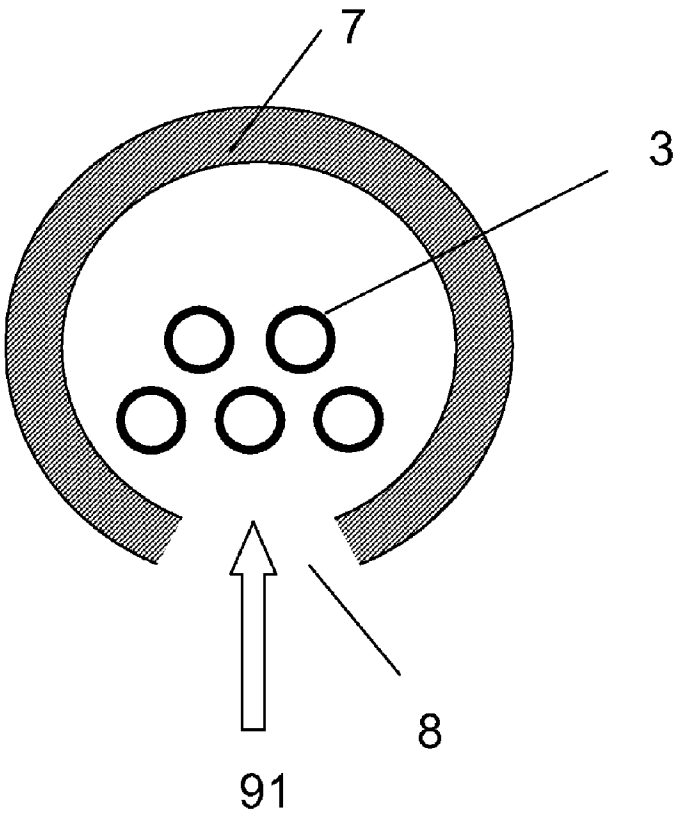
FIGS. 2A and 2B are schematic horizontal cross-sections of solar reactors having multiple nonporous inner reaction shells within an outer protection shell, viewed from the top of the reactor.
Figure 2A:
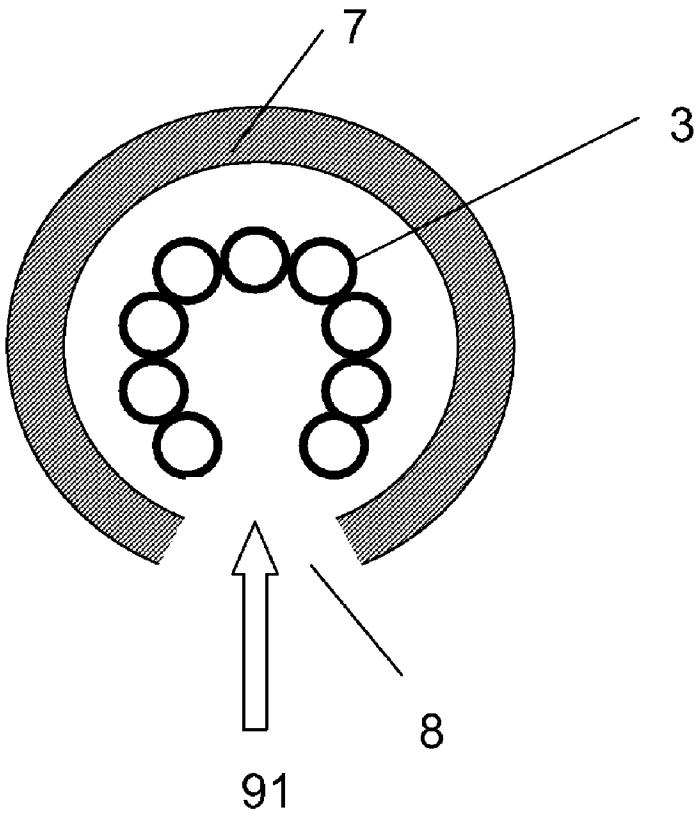

The reactor may also have a plurality of non-concentric reaction shells substantially enclosed by the outer shell, as illustrated in FIGS. 2a and 2b. FIGS. 2a and 2b are also schematic top views of horizontal cross-sections of the reactor. FIG. 2a illustrates a configuration in which the inner tubes (3) are arranged along an arc within the outer tube (7). FIG. 2b illustrates an embodiment in which the inner tubes (3) are arranged in a staggered configuration within the outer tube (7). The tube arrangement is not limited to these two spatial configurations, as explained in more detail below. The specific arrangement can be selected to maximize efficiency. In one embodiment, the tubes are arranged in a staggered pattern. In another embodiment, the centers of the tubes are aligned along a semicircle. In an embodiment, the number of inner reaction shells is from 3 to 10.

A non-oxidizing and non-dissociating "purge" gas may be flowed in a second plenum substantially located between the outer shell and the inner shells to protect the inner shells from oxidation, depending on the material(s) of the inner shells. In this case, the protection shell does not have an opening to the atmosphere. The purge gas may be argon, helium, neon, nitrogen, or any other chemically inert gas.

In another embodiment, the reaction shell is at least partially porous, to allow a "fluid wall" to be formed at the inner surface of the reaction shell. A "fluid wall" gas is flowed radically inward into the reaction shell through the porous section of the shell, thus providing a blanket of gas. The "fluid wall" can prevent deposition of particles on the inside wall and protect the inside wall from the reaction products. As used herein, a "porous" shell region permits gas flow through the walls of the region while a "nonporous" shell region does not. In one embodiment, a gas stream of "fluid-wall" gas flows in the annular region between the outer "protection" shell and the inner "reaction" shell. The "fluid-wall" gas enters the plenum between the inner and outer shell through an inlet and exits the plenum through an outlet. The porous section of the inner shell forms one outlet of the plenum. An additional outlet for the plenum may be used, so long as sufficient gas flow is provided through the porous section of the inner shell.

In another embodiment, an additional nonporous inner shell which substantially encloses the porous reaction shell can be provided. The "fluid wall" gas is supplied to the porous section of the reaction shell by flowing it through the annular space between the two inner shells; this annular space forms a plenum. The "fluid-wall" gas enters the plenum through an inlet and exits the plenum through an outlet. One outlet of the first plenum is the porous section of the inner shell. As used herein, "substantially encloses" means that one shell is enclosed by another for most of the length of the shell. The ends of a shell that is substantially enclosed by another may extend past the ends of the other shell (e.g. the ends of the first inner shell may extend past the ends of the second inner shell and/or the outer shell). In an embodiment, the solar thermal reactor is a solar-thermal fluid-wall reactor as described in United States Patent Application Publication US 2003/0182861 to Weimer et al., which is hereby incorporated by reference to the extent not inconsistent with the disclosure herein. United States Patent Application Publication 20030208959 and U.S. Pat. No. 6,872,378 to Weimer et al. are also hereby incorporated by reference.

A reactor having two concentric inner shells (a first innermost "reaction" shell and a second inner "heating shell") is operated generally as follows. Concentrated solar-thermal radiation passes through the outer "protection" shell and directly heats the second inner "heating" shell. The nonporous heating shell re-radiates from its inner wall and heats the first inner "reaction" shell. Hence, the inner "reaction" shell is heated indirectly by concentrated sunlight from the surrounding "heating" shell. The inner "reaction" shell re-radiates from the inner wall and heats the biomass particles and gas stream flowing through it.

In another embodiment, the invention provides a method for reduction of metal oxide particles comprising the steps of:

a) providing a solar-thermal reactor comprising an outer protection shell and an inner reaction shell having an inlet and an outlet, the outer protection shell being either at least partially transparent or having an opening to the atmosphere for transmission of solar energy;
b) flowing a gas stream comprising entrained biomass and metal oxide particles from the inlet to the outlet of the reaction shell, wherein the biomass and gas stream do not comprise substantial amounts of water;
c) heating the biomass and metal oxide particles in the reactor at least in part with a source of concentrated sunlight through solar thermal heating to a temperature at which the biomass particles pyrolyze to form reaction products comprising hydrogen, carbon, and carbon monoxide and the metal oxide particles react with at least one of the biomass pyrolysis reaction products to form a reduced metal oxide product which is a metal, a metal oxide of a lower valence state, or a combination thereof.

In an embodiment, of the metal oxide reduction process, concentrated solar-thermal radiation passes through the outer "protection" shell and directly heats the inner "reaction" shell. The inner "reaction" shell conducts heat and re-radiates from the inner wall and heats the biomass and metal oxide particles and gas stream flowing through it. Other reactor designs described elsewhere in this application can also be used. When heated, the biomass particles undergo a pyrolysis reaction. Products of the pyrolysis reaction include hydrogen, carbon monoxide, carbon dioxide, and carbon. At elevated temperatures, metal oxide particles can react with hydrogen, carbon monoxide or carbon to form a reduced metal oxide product. Depending on the reactor temperature, the metal oxide particles may react with more than one of the biomass pyrolysis reaction products. For example, at temperatures above about 1475 K, both C and CO are expected to reduce Zone. The primary products exiting the solar thermal reactor are the reduced metal oxide product, $H_2$, CO and $CO_2$. Depending on the temperature distribution within the reactor, the reduced metal oxide product may be present in the reactor in gaseous, liquid, or solid forms, or in combinations thereof. If the reduced metal oxide product is present in gaseous form, a cooling device may be connected to the outlet of the reactor to nucleate reduced metal oxide particles (the reduced metal oxide particles can be metal particles) of the desired size. Cooling devices compatible with solar thermal reactors as described in United States Patent Application No. US 2006-0188433 to Weimer et al., hereby incorporated by reference to the extent not inconsistent with the disclosure herein.

Metal oxides suitable for use with the invention are compounds consisting essentially of one or more metals and oxygen, the compounds being solid at room temperature. In an embodiment, the impurity level is less than or equal to 1%. In an embodiment, the metal oxide is ZnO. In another embodiment, the metal oxide is $SnO_2$. Metal oxides suitable for use with the invention include mixed metal oxides which include more than one metal, such as mixed metal ferrites. As used herein, mixed metal ferrites are compounds of iron oxide with oxides of other transition metals. For example, included would be iron oxides with Ni (II), Co (II), or Man (II) inclusions, such as $MnFe_xO_4$, $NiFe_xO_4$, $Ni_{0.5}Mn_{0.5}Fe_2O_4$ and $Co_{0.5}Mn_{0.5}Fe_2O_4$. High temperature dissociation of such oxides can produce an activated, oxygen deficient form, such as $Ni_{0.5}Mn_{0.5}Fe_2O_{(4-delta)}$. This activated form could be combined with water at relatively low temperatures to yield hydrogen and the original mixed metal oxide. Ferrites useful in the present invention have decomposition temperatures substantially below that of iron oxide. In different embodiments, the particle size of the metal oxide is below 150 microns, or below 100 microns;

The reduced metal oxide product is selected from the group consisting of a metal, a metal oxide and combinations thereof. These combinations can include combinations of metal oxides. For example, $Fe_2O_3$ may reduce partially to $Fe_3O_4$, partially to FeO, and partially to Fe.

In different embodiments, the conversion of the metal oxide to a reduced metal or to a lower oxidation state metal oxide is at least 50%, at least 75%, or at least 90%.

The present invention also provides processes for the production of hydrogen from the reaction of reduced metal oxide products with water. One step in the processes is the reduction of metal oxide particles with biomass pyrolysis products in a high temperature solar thermal reactor as described above. The products of the metal oxide reduction reaction can then be used to react with water in a succeeding step, generating hydrogen and the original metal oxide. Reaction and separation steps following the metal oxide reduction step may be performed "off-sun", allowing continuous production of hydrogen from stored reduced metal oxide product. The "off-sun" step is typically exothermic and can be driven by energy generated by the reaction itself, allowing the entire process to be run on only solar energy.

As used herein, "shells" encompass tubes, pipes or chambers which are elongated along a longitudinal axis. The shells may be circular in cross-section (i.e. the shells are cylindrical tubes) or may have other shapes in cross-section, including, but not limited to ellipses, rectangles or squares. As shown in FIG. 1, the outer shell of the reactor may essentially form a cavity which is largely non-transparent to solar radiation but contains an opening or transparent window to admit solar radiation into the interior. In an embodiment, reflection or absorption and re-radiation occurs at the inner surface of the outer shell. In an embodiment, the inner surface of the outer shell may reflect solar and/or infrared radiation. In an embodiment, the inner surface of the outer shell reflects both solar and infrared radiation. In an embodiment, the inner wall of the outer protection shell is reflective or absorbing or re-emitting with respect to radiation in the wavelength range 200 nm to 20 micrometers. General designs for these types of cavities are known to those skilled in the art. In an embodiment, the inner wall of the outer protection shell comprises a reflective coating such as a gold, silver, or aluminum coating. The reflective coating can reflect incident solar energy and infrared (IR) radiation emitted from the inner shells. The reflective coating may be protected from oxidation by coating it with a thin layer of silica.

In an embodiment, the outer shell may be made of a plurality of layers in close proximity to one another. For example, the outer shell may have three layers. A three-layer outer shell may have an outer layer made of a metal (e.g. steel or an aluminum alloy), a middle layer made of a thermally insulating material (e.g. a refractory material such as alumina), and an inner layer which may be either absorbing or reflective. An absorbing inner layer may be made of a material having relatively low thermal conductivity and capable of withstanding high temperatures (e.g. zirconia, hafnia, alumina). In an embodiment, the absorbing inner layer is constructed of ytrria-stabilized zirconia (YSZ) which heats upon contact with solar energy and re-radiates to the reactor tubes. A reflecting inner layer may be made of a metal such as steel and coated with a gold or silver film; in such case a cooling mechanism may be provided in the middle layer to prevent melting of the reflective material. A reflecting inner layer may also be made of polished aluminum. In an embodiment, the outer shell contains a transparent window. Such a window may be a rectangular vertical quartz window (with the long axis of the rectangle aligned perpendicular to the longitudinal axis of the reactor).

In an embodiment, the outer shell effectively comprises two layers, an outer layer and an inner reflecting or absorbing layer. In an embodiment, the outer layer is made of quartz and the inner layer is a coating of a reflective material such as silver or gold. The coating is applied to the sections of the internal wall of the shell where sunlight is not being concentrated and entering the vessel in order to keep the concentrated sunlight inside the reactor. If such a reflective coating is used, there must be an uncoated transparent section, window or opening to allow the concentrated sunlight into the vessel. The shell wall transparent area, allowing for concentrated sunlight entry and subsequent solar thermal heating, should be selected to provide heating during the desired reaction residence time requirements for the process. If the temperatures at the outer shell wall exceed the melting temperature of the reflective coating, cooling is provided to prevent melting of the reflective coating.

In another embodiment, the outer shell may be formed of a single layer of material. In this embodiment, the shell is of a material which is either transparent or contains a hole or window which admits solar radiation to the interior.

Suitable transparent materials for the outer shell include oxidation resistant materials such as quartz. The "protection" shell may also be made of a metal with a sufficiently high melting point, such as stainless steel. The metal "protection shell" may have a transparent window which allows concentrated sunlight to directly heat the "heating" shell. At least part of the non-transparent part of the "protection" shell can be surrounded by heat transfer fluid contained by a jacket to provide cooling of the outer metal refractory "protection" shell, particularly in the region immediately surrounding the window. The heat transfer fluid can be water or a molten salt such as a mixture of sodium and potassium nitrates. Molten salts are capable of operating at temperatures up to about 500° C. Use of such a cooling jacket can allow for significantly improved efficiency.

In an embodiment, the "reaction" or "heating" shell may be surrounded by refractory insulation in the region where it is not directly exposed to concentrated sunlight via the transparent section. The insulation may be concentrically placed and extends substantially from the "reaction" or "heating" shell to the concentric "protection" shell, although it may not completely fill the space between the heating shell and the protection shell. The refractory insulation can be a combination of graphite insulation near the "heating" shell and an alumina type refractory insulation near the "protection" shell. This design arrangement allows concentrated sunlight to enter through a transparent section and heat the "reaction" or "heating" shell while the surrounding insulation reduces conductive and convective losses of energy from the "reaction" or "heating" shell, thereby increasing the efficiency of the process.

The innermost reaction shell has an inlet and an outlet for the entraining gas stream. The inlet end of the inner shell is the upstream end of the shell, while the outlet end is the downstream end. The interior of the innermost shell defines a reaction chamber within which the high temperature reaction takes place. The innermost shell is capable of emitting sufficient radiant energy to raise the temperature of the reactants within the reaction chamber to a level required to initiate and sustain the desired chemical reaction. The innermost shell is made of a high temperature refractory material. When the particles are indirectly heated, the refractory material subsequently heats flowing biomass particles flowing through the first inner shell.

In an embodiment, the refractory material is substantially chemically unreactive with the particles or the reactant or product gases. In an embodiment, the innermost shell is graphite. In other embodiments, the innermost shell is silicon carbide or a refractory metal or alloy capable of withstanding the temperature required for a given decomposition reaction. Other suitable high temperature ceramics include ytrria-stabilized zirconia (YSZ), silicon nitride, hafnium boride, hafnium carbide, silicon carbide-silicon carbide composites, boron nitride or alumina (aluminum oxide). Refractory metal alloys suitable for temperatures below about 1200° C. include, but are not limited to, high temperature superalloys, including nickel-based superalloys such as Inconel® or Haynes® 214. In another embodiment, the innermost shell may be made of quartz. In an embodiment, the reaction shell is made of silicon carbide, Inconel, quartz, silicon nitride, or alumina.

The inner reaction shell may be made of a nonporous material. In another embodiment, the innermost shell is at least partially porous. The innermost shell may be wholly of porous material or may comprise one or more regions of porous material. The porous region(s) of the innermost shell are selected so that sufficient uniform flow of gas occurs radially inward through the pores to provide a fluid-wall protective blanket for the radially inward surface of the innermost shell. The porosity of the porous region(s) can be varied and is selected on the basis of the required gas flow and allowable pressure drop to provide for a fluid-wall of gas. The length of the porous section(s) of the "reaction" shell can be varied and is determined by the zone where oxidation of the "reaction" shell or particle deposition is most likely to occur. The placement of the porous section along the length of the "reaction" shell is determined by the same considerations. In an embodiment, the length of the porous section of the "reaction" shell is limited to where it is needed. The entry of fluid-wall gas into the "reaction" shell increases the overall volumetric flow rate of gases through the "reaction" shell, thus reducing residence time and limiting the production throughput of the reactor. In an embodiment, the porosity in a given porous region is substantially uniform. A partially porous reaction tube may be made by joining together a porous tube and a solid tube. Graphite tubes may be joined by high temperature sintering using a carbon-containing paste. Silicon carbide tubes may also be joined by sintering with the appropriate sintering aid. Metal or alloy tubes may be welded or brazed, including porous metal or alloy sections. In different embodiments, the ratio of the length of the reaction shell to the inner diameter of the reaction shell is from 2 to 12, from 2 to 4, from 4 to 6, from 6 to 12, between 5 and 30, between 5 and 10, and between 20 and 25.

When a plurality of reaction shells are present in the reactor, the reaction shells may have the same inner diameter or may have different inner diameters. In an embodiment, the inner shells have different inner diameters and smallest inner shell has an inner diameter one third the inner diameter of the largest inner shell. In this embodiment, the larger inner shells may be located closer to the center of the outer shell then the smaller inner shells.

If used, the second inner shell is typically composed of nonporous high temperature refractory material. In an embodiment, the second inner shell is made of solid graphite. As previously discussed, the second inner shell can function as a "heating" shell, since it radiates heat to the innermost shell. In addition, the combination of the first and the second inner shell can at least partially define a plenum or volume for the fluid-wall gas. Depending on the material of the second inner shell, a non-oxidizing and non-dissociating "purge" gas may be flowed in a second plenum substantially located between the outer shell and the second inner shell to protect the second inner "heating" shell from oxidation. The purge gas may be argon, helium, neon, nitrogen, or any other chemically inert gas.

In general, the shells comprising the reactors of the invention may be positioned vertically or horizontally, or in any other spatial orientation. For the case of a vertical reaction shell process, the apparatus may be arranged to provide upward or downward flow of the gas stream and the cloud of particles. Upward flow guarantees that aggregated particles will not be carried through the reaction shell. Downward flow reduces the potential for plugging in the solids feed line. Preferably, the reactor shell is positioned vertically and flow is downward.

Each of the shells is characterized by a longitudinal axis (vertical centerline). In the plane created by cross-sectioning the reactor transverse to the longitudinal axis of the outer shell so that the plane passes through the outer shell window or aperture, a first horizontal dividing line (this line can also be termed the horizontal centerline) can be defined which passes through the center of the outer shell and the window or aperture, dividing the outer shell and the window or aperture into two equal or nearly equal halves. This horizontal centerline can be said to establish right and left portions inside the outer shell. A second horizontal dividing line can be established in the same plane which passes through the center of the outer shell, is orthogonal to the horizontal centerline, and establishes front and back portions inside the outer shell, with the front portion being the portion nearest the aperture or window.

To describe positions of the inner shells within the outer shell in a horizontal cross-section of the outer shell, an x,y coordinate system can be defined whose origin is at the center of the outer shell and in which the y axis of the coordinate system is aligned with the horizontal centerline as defined above and the x axis of the coordinate system is aligned with the second horizontal dividing line as defined above.

Locations of the inner shells can also be specified by their distance from particular locations with respect to the outer shell. For example, the location of the center of an inner shell can be specified by its distance from the intersection of the horizontal centerline with the inner surface of the outer shell at the "back" portion of this inner surface, opposite the aperture or window. Locations may also be determined with respect to the center of the outer shell.

Locations of the inner shell can also be specified by their orientation with respect to the average direction of the solar radiation entering the solar reactor. In an embodiment, the average direction of the solar radiation is generally aligned with the horizontal centerline.

If the center of a first inner shell is "farther back" in the outer shell than the center of a second inner shell, the y component of the distance between the center of the first inner shell and the intersection of the horizontal centerline with the "back portion" of inner surface of the outer shell is smaller than the y component of the distance between the center of the second inner shell and the intersection of the horizontal center line with this back portion of the inner surface of the outer shell.

In an embodiment, at least three inner shells are located within the outer shell. In another embodiment, the number of inner shells is from 3 to 10. In other embodiments, the number of inner shells is 3 or 5.

In an embodiment, the outer walls of the inner shells are not in contact with one another. In an embodiment, the spacing between the outer walls of the inner shells is a multiple of the diameter of an inner shell. In different embodiments, this multiple is 0.05 to 1.0, 0.05 to 0.1, 0.1 to 0.2, 0.2 to 0.5 and 0.5 to 1.0.

The inner shells may be arranged in a variety of configurations. For convenience, the configurations may be described by the relative positions of the centers of the inner shells in a planar cross-section transverse to the longitudinal axis of the outer shell. In an embodiment, the centers of the inner shells do not lie along a single straight line.

In an embodiment, the centers of the inner shells lie along a circular arc, with the ends of the arc being established (anchored) by the positions of the center of the inner shells closest to the outer shell. The arc is bisected by the horizontal centerline. In an embodiment, the circular arc is a semicircle. In an embodiment the center of the arc is farther back in the shell than the ends of the arc (the arc bows towards the aperture).

In another embodiment, the inner shells are arranged in a staggered pattern. In an embodiment, the inner shells can be grouped into a plurality of rows, each row being generally perpendicular to the horizontal centerline but having a different depth within the outer shell (different y coordinate). The rows may form a straight line or they may be somewhat curved. In an embodiment, the rows form a straight line parallel to the x axis. The centers of the shells in each row are positioned so that they do not "line up" with (do not have the same x coordinate as) shells in adjacent rows. Each row has at least one shell, and may have a plurality of shells. In an embodiment, the pattern is generally symmetric about the horizontal centerline. The pattern can also be viewed in terms of the geometric properties of lines drawn between the centers of neighboring inner tubes. For example, the angle made between a line drawn between the center point of a first inner tube in a "front" row and the center point of a second neighboring tube in the row behind the "front" row and the line drawn between the center point of the second tube and the center point of a third inner tube located in the "front" row (which is a neighbor to both the first and second tube) can be from 40 degrees to 140 degrees or from 60 degrees to 130 degrees. The specific arrangement is chosen so as to maximize interception of incident radiation.

In an embodiment, three inner shells are arranged in a triangular configuration, so that the line between the centers of the shells forms a triangle in a horizontal cross-section. One of the shells is located farther back in interior of the outer shell than the other two. This can be viewed as a first row of two shells and a second row of one shell, with the second row being farther back than the first row. In an embodiment, the center of inner shell in the second is located along the horizontal centerline.

In another embodiment, five inner shells are arranged in a staggered pattern. The five inner shells can be separated into a first group of three inner shells and a second group of two inner shells, the two inner shells in the second group being located farther back in the tube than the three inner shells in the first group. In an embodiment, the width (x component of the distance) spanned by the first group of shells is greater than the width spanned by the second group. If lines are drawn between the center points of neighboring inner tubes, a pattern of triangles may be formed.

In an embodiment, the invention provides a solar thermal reactor system for heating particles entrained within a gas, the reactor comprising:

a) an outer shell, the side wall of the outer shell not permitting transmission of solar radiation except at a window or aperture in the side wall, at least a portion of the side wall interior away from the window or aperture comprising a material reflective to solar radiation wherein in a cross-section of the reactor made through the outer shell window or aperture and perpendicular to the longitudinal axis of the outer shell, the outer shell is characterized by a horizontal centerline which extends through the window or aperture;

b) at least three inner shells at least partially located within the outer shell, each inner shell having a longitudinal axis parallel to the longitudinal axis of the outer shell, wherein the inner shells are not concentric and are arranged so that the outer side walls of the inner shells are not in contact with each other and so that in the reactor cross-section, the centers of the inner shells are not aligned along a single straight line;

c) a particle entrainment feeding system in fluid communication with the inner shells; and d) a source of concentrated solar radiation disposed so that the window or aperture of the outer shell is exposed to solar radiation In the entrained flow reactors used in the practice of the invention, the biomass particles or droplets are entrained in the carrier gas and are generally transported along the longitudinal axis of the reaction tube (or tubes). The biomass particles or droplets are dispersed in the reactor apparatus, and the form of dispersion is important. Preferably, the particles or droplets flow as a dust or particle cloud through the apparatus, dispersed in a dispersing process gas. Preferably, the particles are non-agglomerated. In an embodiment, the biomass is in the form of solid particles. In an embodiment, the solid biomass particles are not enclosed in water droplets. Several different methods can be used to disperse solid particles. In an embodiment, the particles are entrained by a fluidized bed feeder. The particles can also be dispersed mechanically, such as by shearing on the surface of a rotating drum or brush. Alternatively, the particles can be dispersed using the shear provided by high velocity gas exiting with the particles from a feed injection tube. Experience has shown that the exiting "tip speed" from the injection tube should be at least 10 m/s to provide the shear necessary for complete dispersion of fine powders. In other embodiments, the biomass feedstock may also be a liquid and atomized into the aerosol stream or a solid mixed with liquid to create a slurry which is then introduced into the reactor.

The initial composition of the gas used to entrain the biomass particles or droplets may be an inert gas, steam, a recycled or compatible reaction product gas such as hydrogen, carbon monoxide, carbon dioxide, or a mixture thereof. In an embodiment, the entraining gas is a mixture of inert gas and steam. Suitable inert gases include, but are not limited to nitrogen, argon, helium, or neon. In an embodiment, the initial composition of the entraining gas does not contain substantial amounts of molecular oxygen or air. The composition of the entraining gas may also vary along the reactor. For example, the entraining gas may be provided as an inert gas at the reactor inlet and become a mixture of inert gas and gaseous reaction products downstream of the reactor inlet. Steam can be introduced after the particles are entrained in a gas mixture, but prior to introduction of the entrained particles into the reactor. Steam can also be fed through a steam micronizer as jets of steam, located at the feed inlet of the reactor. In this case, jets of steam impinge on biomass being fed and provide a means to reduce the particle size of the biomass feed in-situ at the entrance of the reactor. The entraining gas stream is selected so that it is compatible with the biomass particle pyrolysis or gasification process and the "reaction" wall of the solar-thermal fluid-wall reactor. The gas stream can be preheated to reduce the requirements of the solar thermal field and increase efficiency by passing it through a heat exchanger, removing heat from the products of the solar thermal reactor. Additionally, heat could be removed from an exothermic downstream fuel processing unit (Fischer-Tropsch reactor, water gas shift reactor, or combustion turbine).

In the methods of the invention, biomass particles are heated at least in part with a source of concentrated sunlight. The source of concentrated sunlight may be a solar concentrator. Preferably, the solar concentrator of the apparatus is designed to optimize the amount of solar thermal heating for the process. Solar fluxes between about 1000 and about 3000 $kW/m^2$ have been shown to be sufficient to heat solar thermal reactors to temperatures between 1000 and 2500 K. In different embodiments, the solar flux is from 500 to 1500 $kW/m^2$, from 1500 to 3500 $kW/m^2$, from 3000 to 5000 $kW/m^2$, or from 3500 to 7000 $kW/m^2$. Fluxes above 3000 $kW/m^2$ may be used achieve even higher temperatures, receiver efficiencies, and reactor throughputs, although the cost of using fluxes in this range is expected to be higher. Since the solar radiation is generally focused to approximately match the aperture/window size, the size of the aperture and the flux are correlated.

The temperature inside the innermost shell of the reactor can be measured with a thermocouple. Alternatively, temperatures inside the reactor can be measured with an optical pyrometer. For a three-shell reactor, the hot zone temperature measured with an optical pyrometer is typically the temperature of the nonporous "heating" shell, since the "heating" shell encloses the "reaction" shell in the hot zone. The temperature inside the inner "reaction" shell may be less than that of the "heating" shell due to thermal losses due to heating the porous shell and the gases in the first plenum and the reaction shell.

The sunlight can be provided in the form of a collimated beam (spot) source, a concentric annular source distributed circumferentially around the reactor, or in the form of a linearized slot source providing heating axially along the length of reactor. The light can be redirected and focused or defocused with various optical components to provide the concentration on or in the reactor as required. In an embodiment, the concentrated solar radiation is further concentrated by a secondary concentrating reflector before entering the reactor. An example of a suitable solar concentrator for use in the present invention is the High-Flux Solar Furnace (HFSF) at the National Renewable Energy Laboratory (NREL) in Golden, Colo. The HFSF uses a series of mirrors that concentrate sunlight to an intensified focused beam at power levels of 10 kW into an approximate diameter of 10 cm. The HFSF is described in Lewandowski, Bingham, O'Gallagher, Winston and Sagie, "Performance characterization of the SERI Hi-Flux Solar Furnace," Solar Energy Materials 24 (1991), 550-563. The furnace design is described starting at page 551, wherein it is stated, > The performance objectives set for the HFSF resulted in a unique design. To enable support of varied research objectives, designers made the HFSF capable of achieving extremely high flux concentrations in a two-stage configuration and of generating a wide range of flux concentrations. A stationary focal point was mandatory because of the nature of many anticipated experiments. It was also desirable to move the focal point off axis. An off-axis system would allow for considerable flexibility in size and bulk of experiments and would eliminate blockage and consequent reduction in power.
>
> In particular, achieving high flux concentration in a two-stage configuration (an imaging primary in conjunction with a nonimaging secondary concentrator) dictates a longer f/D [ratio of focal length to diameter] for the primary [concentrator] than for typical single-stage furnaces. Typical dish concentrators used in almost all existing solar furnaces are about f/D=0.6. To effectively achieve high flux concentration, a two-stage system must have an f/D=2. Values higher than this will not achieve significantly higher concentration due to increased losses in the secondary concentrator. Values lower than this will result in a reduction of maximum achievable two-stage flux. At low values of f/D, the single stage peak flux can be quite high, but the flux profiles are also very peaked and the average flux is relatively low. With a longer f/D, two-stage system, the average flux can be considerably higher than in any single-stage system. The final design of the HFSF has an effective f/D of 1.85. At this f/D, it was also possible to move the focal point considerably off axis (~30°) with very little degradation in system performance. This was because of the longer f/D and partly because of the multi-faceted design of the primary concentrator. This off-axis angle allows the focal point and a large area around it to be completely removed from the beam between the heliostat and the primary concentrator.

When the outer shell is wholly transparent or has a window which extends completely around the shell, the concentrated sunlight is preferably distributed circumferentially around the reactor using at least one secondary concentrator. Depending upon the length of the reaction shell, multiple secondary concentrators may be stacked along the entire length of the reaction shell. For the HFSF described above, a secondary concentrator that is capable of delivering 7.4 kW of the 10 kW available (74% efficiency) circumferentially around a 2.54 cm diameter×9.4 cm long reaction tube has been designed, constructed, and interfaced to the reactor.

The invention also provides reactor systems which combine the reactor of the invention with one or more other system elements. Typically, the outlet of the reactor will be coupled to a device for collecting any solids exiting the reactor. These solids may be unreacted or partially reacted biomass particles, ash, or reaction products. Any suitable solids collection device known to the art may be used, including, but not limited to gravity collection vessels and filters.

As used herein, the "residence time" is the time that the biomass particles spend in the hot zone of the innermost "reaction" shell. The hot zone length may be estimated as the length of the reactor directly irradiated by the source of concentrated sunlight. The residence time depends on the reactor dimensions, such as the hot zone length and the inner diameter of the "reaction" shell. The residence time also depends on the flow rate of the entraining gas stream containing the biomass particles and the flow rate of any fluid-wall gas through the pores of the inner shell. In addition, the residence time may vary across the diameter of the reaction shell, in which case a mean residence time may be calculated. The residence time may be calculated through modeling or estimated from ideal gas considerations. In different embodiments, the residence time is less than or equal to 10 seconds, less than or equal to 5 seconds, or less than or equal to 3 seconds. The biomass may or may not be completely reacted before it leaves the hot zone.

If used, the fluid-wall gas is selected to be compatible with the reactants and the products. The fluid-wall gas is compatible if it allows the desired reaction to take place and/or it is inert to the reactants, products, and materials of construction for the reaction and protection shells and/or is not difficult to separate from the gas stream exiting the "reaction" shell and/or the cooling device. The fluid-wall gas used in the solar-thermal reactor is also selected so that it is compatible with the "reaction" shell. The gas stream used to provide the "fluid-wall" blanket gas flowing inward from the porous "reaction" shell wall is also preferably not a dissociating gas whose dissociation products would plug the pores of the porous wall. Inert gases, such as helium, $N_2$ or argon are suitable for use as the fluid-wall gas Downstream separation units are used to remove entrainment gas from the reaction products and separate the reaction products based on the end application. Possible separation units include pressure swing adsorbers, vacuum swing absorbers, membrane separators, or a combination thereof. In an embodiment, $CO_2$ in the reaction products is recycled and used as the entrainment gas.

Products from the process can be used in a number of ways. These ways include, but are not limited to:

1) Combination of product hydrogen and carbon monoxide or carbon dioxide in a Fischer-Tropsch (FT) style reactor to produce hydrocarbons. These hydrocarbons could include, but are not limited to, methanol, methane, gasoline (C5-C12), ethanol, propane, butane, diesel fuels, jet fuels, and specialty organic chemical products. Uses for such hydrocarbons would include transportation fuels, heating fuels, and fuels for stationary electric power generation, but the uses are not limited to these.

2) Combination of the carbon monoxide product with additional water in a Water-Gas Shift reactor to produce additional hydrogen and carbon dioxide. The product hydrogen could be used in fuel cells for electrical power generation, as a combustion fuel, as a desulfurization agent for gasoline, transportation fuels, or coal, or for specialty chemical synthesis, but its uses are not restricted to this.

3) Direct separation of the product hydrogen for use as specified in #2)

4) Direct combustion of the product stream for power generation, heat generation, or other similar purposes.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

One skilled in the art would readily appreciate that the present invention is well adapted to carry out the objects and obtain the ends and advantages mentioned, as well as those inherent therein. The devices and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims.

All patents and publications mentioned in the specification are indicative of the levels of skill of those skilled in the art to which the invention pertains. All references cited herein are hereby incorporated by reference to the extent that there is no inconsistency with the disclosure of this specification.

EXAMPLE 1

Figure 3:
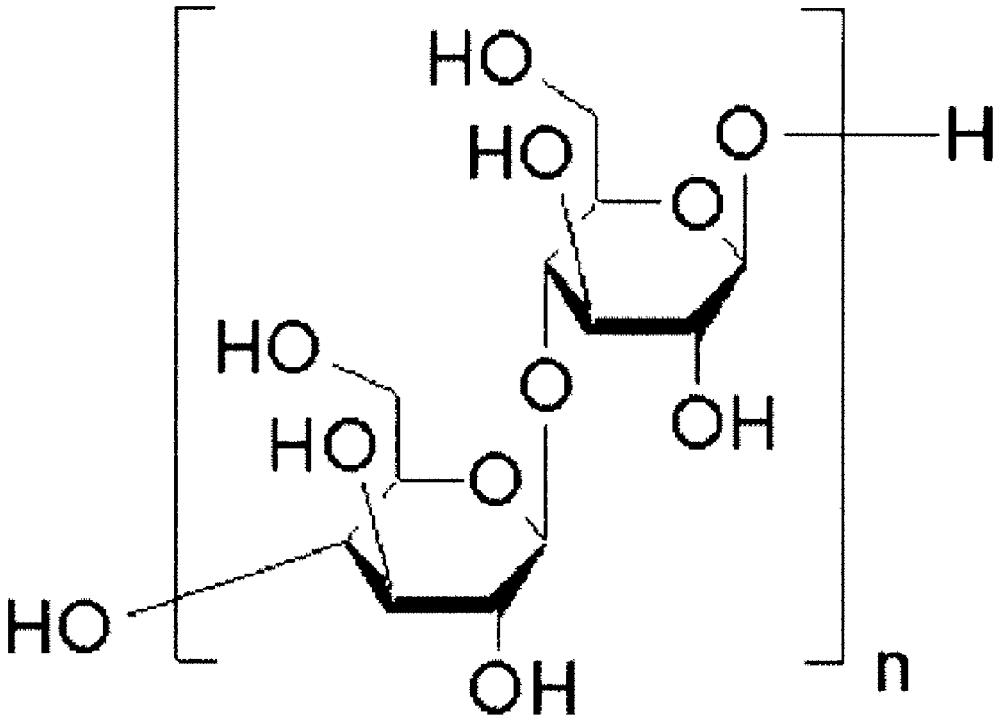
FIG. 3 illustrates the monomer unit of the cellulose particles used in the Examples.
Figure 4:
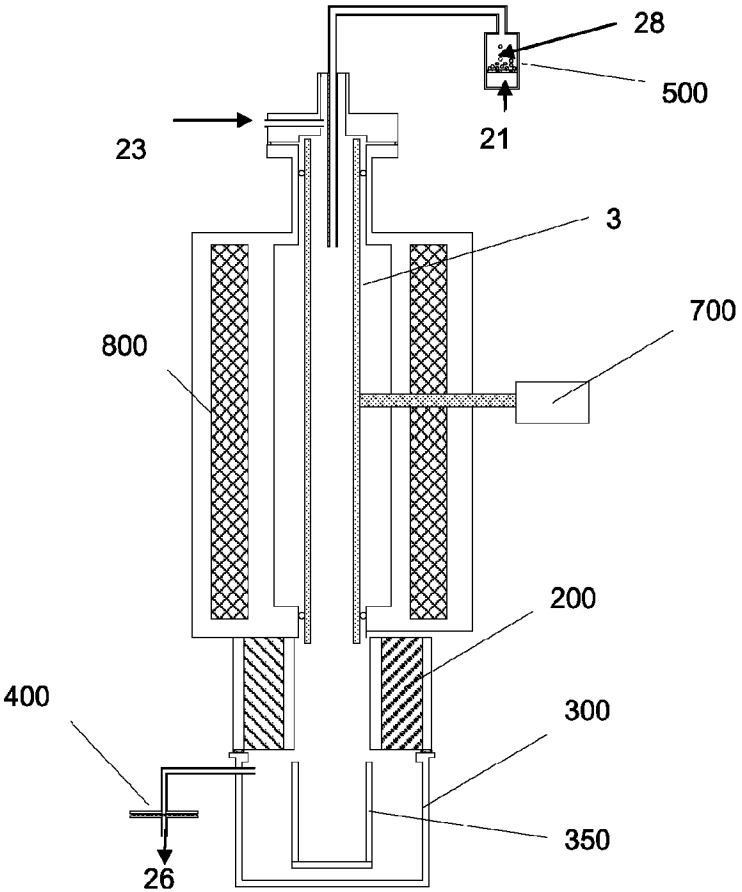
FIG. 4 is schematic vertical cross-section of an electrically heated reactor system used in Examples 1-3, and 5.

Cellulose Gasification in an Electrically Heated Aerosol Transport Tube Reactor Cellulose was combined with water vapor in an electric tube furnace at temperatures between 1200 K and 1450 K. The cellulose was composed of fine particles (Sigma-Aldrich #310697, 20 μm) with a monomer unit shown in FIG. 3. The reactor apparatus is shown in FIG. 4. The reactor consisted of a 99.8% Alumina tube (3) (McDanel Technical Ceramics), 3.635" in internal diameter by 45" in length. This tube was heated indirectly using a surrounding electrically heated graphite resistance element (800). The interior of the $Al_2O_3$ tube was sealed from the outer graphite element and purged with argon gas to eliminate oxygen. Particles of cellulose were placed in a fluidized bed feeder (500); fluidization gas (21) (argon) entrained the particles, carrying them into the hot reactor, where they were combined with water vapor (23). The water flowrate was controlled by a syringe pump, and the water was introduced into the hot reactor environment through a capillary tube. The molar feed ratio of cellulose to water was approximately 1:1. A pyrometer (700) was used to measure the temperature of the reaction tube.

After leaving the heated portion of the reactor, the reaction products were passed through a gravity collection vessel (350) and an HEPA (high efficiency particulate air) filter (400) (200 nm pore size). Large particles would be collected in the gravity vessel, with smaller, entrained particles accumulating on the HEPA filter. The gravity collection vessel was contained in an outer containment collection vessel (300). The exhaust gases (26) were analyzed using mass spectrometry and NDIR (nondispersive infrared) $CO/CO_2$ detection.

Experiments were performed in a $2^2$ full factorial design. The two factors were temperature and total entrainment gas flow. The larger the value of the entrainment gas flow, the shorter the residence time within the reactor. The temperature factor levels were 1200 K and 1450 K, and the total gas flow factor levels were 10 SLPM and 15 SLPM (standard liters per minute).

Figure 5:
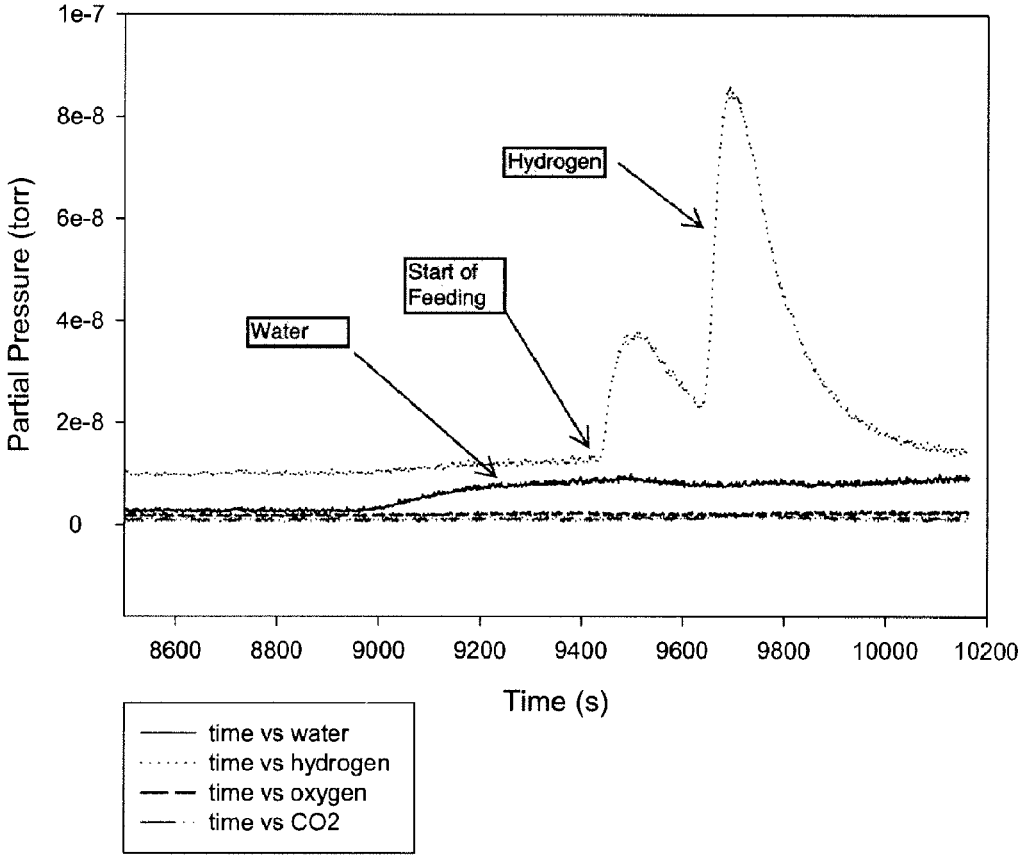
FIG. 5 is a mass spectrometer trace from cellulose gasification as performed in Example 1.

At the highest temperature condition and lowest flowrate, the mass spectrometer (MS) trace showed an immediate increase in $H_2$ production at the start of feeding. (FIG. 5) The scales for the different molecules differ, so a relatively larger increase in partial pressure of one species does not necessarily mean a larger increase in molar flowrate of that species. This was better determined by NDIR analysis. An increase in CO concentration followed shortly after the $H_2$ peak, and could be seen on the NDIR detector. At the start of feeding, the water concentration decreased, indicating reaction. This amount recovered with the waning of the hydrogen peak, indicating that at least some of the hydrogen was coming from the water. Integration under the NDIR peak yielded 0.006 mol of CO produced. Based on the amount of material fed, this gives conversion of cellulose to CO at 94%. When including $CO_2$ production, the conversion increased to 98%. This is essentially complete gasification of the feed material. No differential pressure increase was detected, and no mass was collected in the gravity vessel, on the HEPA filter, or on the walls of the reactor.

Reaction of material at 15 SLPM and 1450 K yielded similar results. Gasification conversion of the feed material was 95%, and no material was collected in the reactor for 0.9 g fed. There was no increase in differential pressure across the HEPA filter, indicating no buildup of material.

At the lower temperature, 950° C., both flowrate conditions also showed fairly high conversion (65%). Much of this material was collected in the gravity vessel, and resembled the feed material in composition. Also, differential pressure across the HEPA filter indicated a large deposit of material, likely incomplete products of gasification. This differential pressure increased rapidly, and reached a level high enough to trigger the safety pressure relief devices on the apparatus. From the factorial experiments it was clear that more complete gasification was obtained in short residence times at ultra-high temperatures (>1000° C.). These are temperatures are achievable in concentrated solar energy systems.

EXAMPLE 2

Figure 6:
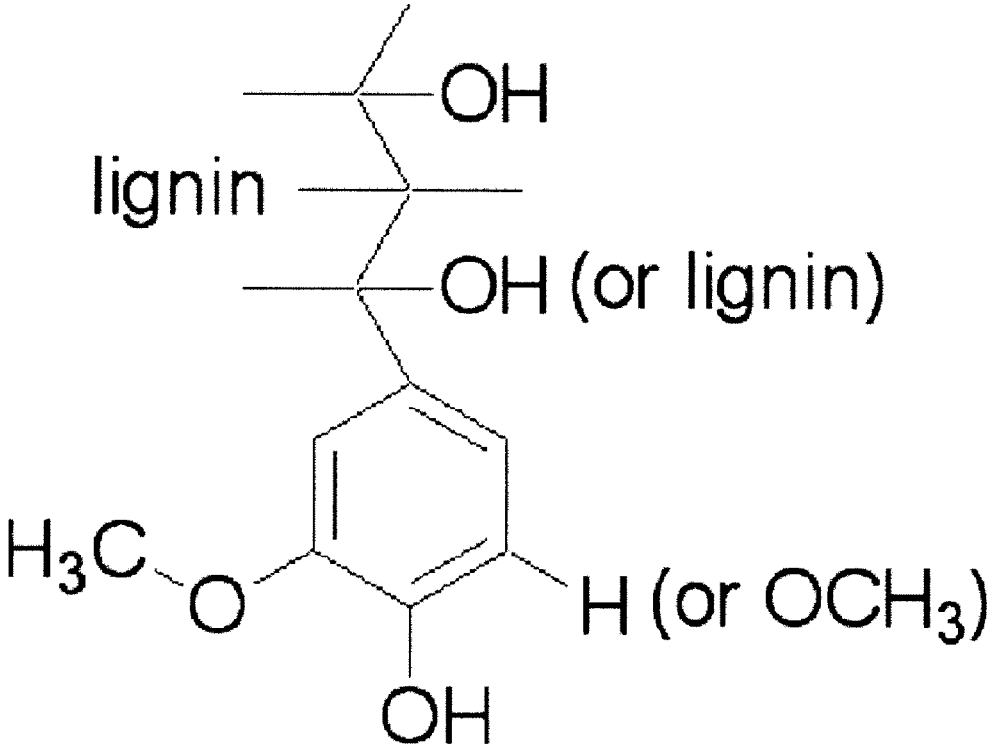
FIG. 6 illustrates the monomer unit of the lignin particles used in the Examples.

Lignin Gasification in an Electrically Heated Aerosol Transport Tube Reactor Lignin was combined with water vapor in an electric tube furnace at 1450 K. The lignin was composed of fine particles (Sigma-Aldrich #371017, 20 μm) with a monomer unit shown in FIG. 6. The reactor was the same as in Example 1. The interior of the $Al_2O_3$ tube was sealed from the outer graphite element and purged with argon gas to eliminate oxygen. Particles of lignin were placed in a fluidized bed feeder; fluidization gas (argon) entrained the particles, carrying them into the hot reactor, where they were combined with water vapor. The water flowrate was controlled by a syringe pump, and the water was introduced into the hot reactor environment through a capillary tube.

After leaving the heated portion of the reactor, the reaction products were passed through a gravity collection vessel and an HEPA filter (200 nm pore size). Large particles would be collected in the gravity vessel, with smaller, entrained particles accumulating on the HEPA filter. Gas analyses were performed using mass spectrometry and NDIR $CO/CO_2$ detection.

The demonstration experiment was performed at 1450 K and around a 1:1.5 molar feed ratio of lignin to water.

Conversion of the material was essentially complete (98%), with products existing as C, $CO_2$, and CO. The C was in the form of fine powder and made up about 30% of the carbon in the exit stream. With higher ratios of water to lignin, thermodynamics allow further gasification of this carbon. The $CO_2$ to CO ratio in the outlet gas was about 1:10, showing conversion to favorable to CO.

EXAMPLE 3

Cellulose and Lignin Pyrolysis in an Electrically Heated Aerosol Transport Tube Reactor Cellulose and lignin were pyrolyzed in an electric tube furnace at temperatures between 1200 K and 1450 K. Each material was fed in separate experiments. The cellulose was composed of fine particles (Sigma-Aldrich #310697, 20 μm) and the lignin was also composed of fine particles (Sigma-Aldrich #371017) The reactor apparatus is similar to that in Example 1. The interior of the $Al_2O_3$ tube was sealed from the outer graphite element and purged with argon gas to eliminate oxygen. Particles of cellulose or lignin were placed in a fluidized bed feeder; fluidization gas (argon) entrained the particles, carrying them into the hot reactor, where they joined by sweep argon gas to control residence time.

After leaving the heated portion of the reactor, the reaction products were passed through a gravity collection vessel and an HEPA filter (200 nm pore size). Large particles would be collected in the gravity vessel, with smaller, entrained particles accumulating on the HEPA filter. Gas analyses were performed using mass spectrometry and NDIR $CO/CO_2$ detection.

Experiments were performed in a $2^2$ full factorial design for each feed material. The two factors were temperature and total entrainment gas flow. The larger the value of the entrainment gas flow, the shorter the residence time within the reactor. The temperature factor levels were 1200 K and 1450 K, and the total gas flow factor levels were 10 SLPM and 15 SLPM.

Figure 7:
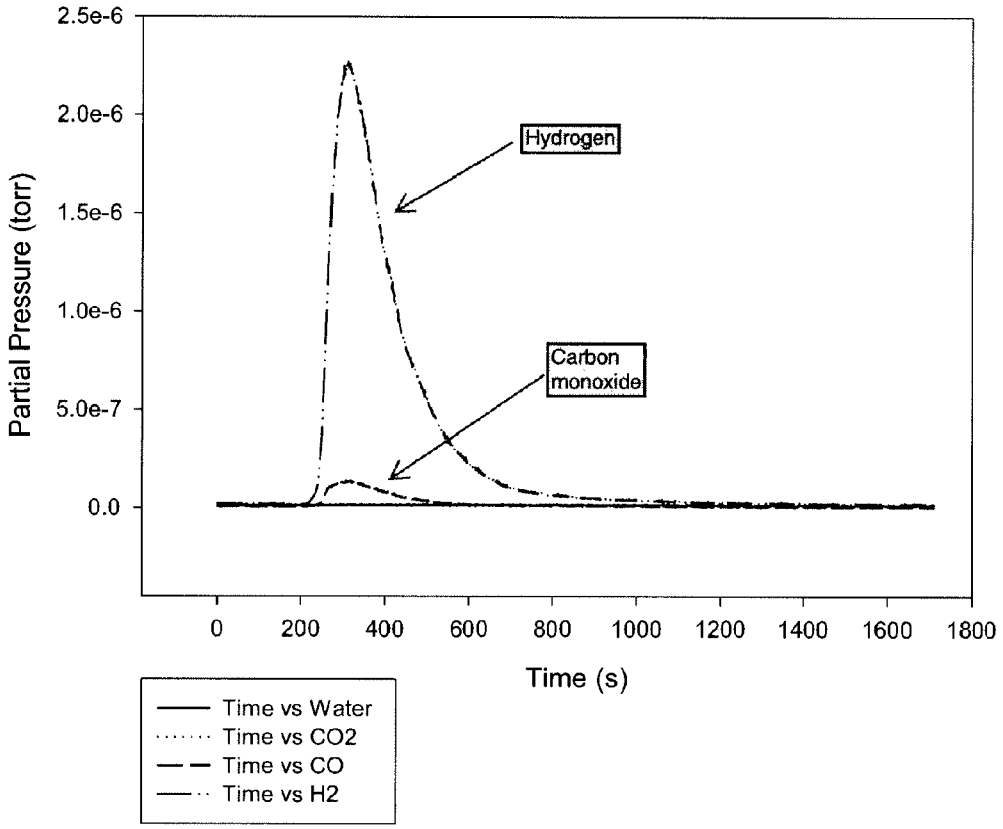
FIG. 7 is a mass spectrometer trace from lignin gasification as performed in Example 2.

The mass spectrometry trace for the high temperature, low flowrate cellulose pyrolysis experiment is shown in FIG. 7. As can be seen, both hydrogen and carbon monoxide increase rapidly upon introduction of the feed material. These are the thermodynamically expected products, and this trace is representative of all of experiments as a whole.

For cellulose pyrolysis, conversion was high at high temperatures. For the short residence time point at 1450 K, the conversion to CO and $CO_2$ was 80%, with $CO:CO_2$ ratios around 12:1. This was similar for the long residence time point, with 85% conversion and $CO:CO_2$ ratios near 10:1. The conversion was lower in the low temperature points, with a significant amount of solid material collected in the reactor (over ⅓ of the mass fed). LECO TC600 and C200 (Leco Corp.) analysis showed carbon and oxygen levels similar to the feed composition, but structural rearrangements would be possible. In any case, at the low temperatures, the conversions to carbon oxides in the gas were 60% and 61%, with similar $CO:CO_2$ ratios as in the high temperature experiments. It is clear that high temperatures (>1300 K) produced more effective pyrolysis of this material.

Lignin pyrolysis products included a significant amount of fine black powder. LECO C200 analysis of this powder showed it to be >96% carbon for each of the high temperature points, and a lower >75% carbon for the low temperature experiments. This is likely due to unreacted lignin in products. Conversion to CO was higher at higher temperatures, being between 40% and 45%. These are right around the theoretical maximum, although some adsorbed water on the feed material could push the theoretical conversion higher due to gasification. The conversion was lower at 1200 K, at 16% and 18% for the low and high residence time points, respectively. In all of the experiments, the ratio of CO to $CO_2$ in the exit stream was between 8:1 and 10:1.

EXAMPLE 4

Cellulose Gasification in Solar Heated Aerosol Transport Tube Reactor

Figure 8:
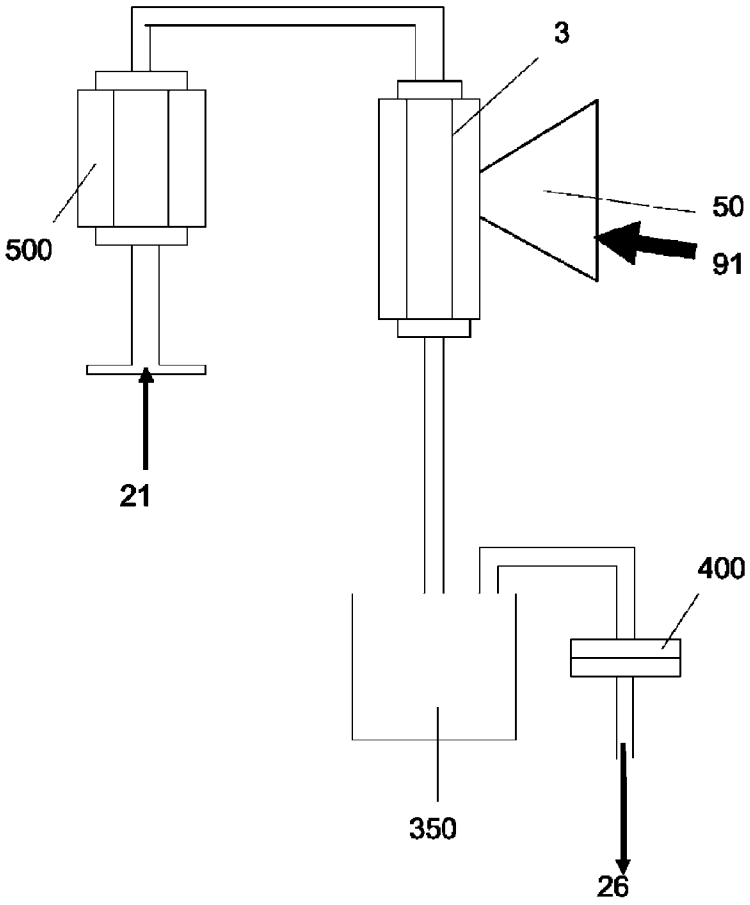
FIG. 8 is a schematic of the solar heated reactor system used in Example 4. In this reactor system, an alumina reaction tube is contained within a quartz sheath.

Cellulose was combined with water vapor, at a temperature of 1423 K, in a solar heated tube furnace. The solar reactor apparatus is shown in FIG. 8. The reactor consisted of a 99.8% alumina tube (3) (CoorsTek ceramics) having an inner diameter of 0.75" and a total length of 14". The heated length of the tube was 8". The tube was surrounded by a quartz sheath, sealed to the outside air and purged with argon gas. The cellulose was composed of fine particles (Sigma-Aldrich #310697, 20 μm). The cellulose particles (28) were introduced into the system from the top using a fluidized bed feeder (500). Argon was used as the fluidization gas (21) to entrain the particles and carry them into the hot zone of the reactor, where they combined with water vapor. The water was introduced into the reactor with a syringe pump. The molar feed ratio of cellulose to water was approximately 1:1.

The tube was heated with concentrated solar energy at the High Flux Solar Furnace facility at the National Renewable Energy Laboratory. The solar concentration of the system at the front of the secondary concentrator (50) was approximately 1000 suns (approximately 1000 $kW/m^2$), and at the exit of the concentrator was approximately 2000 suns (approximately 2000 $kW/m^2$).

After leaving the heated portion of the reactor, the reaction products were passed through a gravity collection vessel and a HEPA filter (200 nm pore size). Large, heavy particles were collected in the gravity vessel (350), while smaller, entrained particles collected on the HEPA filter (400). The product gas (26) was analyzed using a mass spectrometer (MS).

Figure 9:
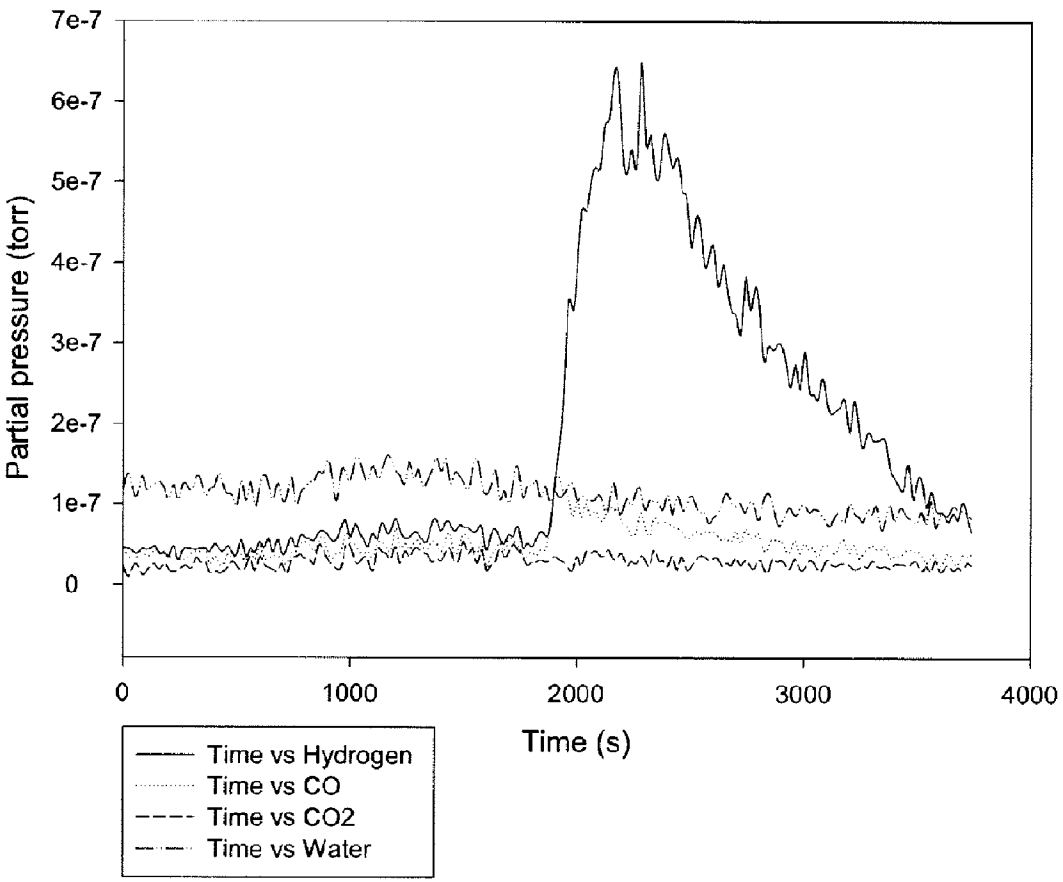
FIG. 9 is a mass spectrometer trace from solar cellulose gasification as performed in Example 4.

The entrainment gas flow rate correlated to the residence time of particles within the reactor. For this experiment, the entrainment flow rate was set to 1.25 SLPM. The MS trace showed an immediate increase in $H_2$ and CO production at the onset of particle feeding, accompanied by a decrease in the water trace, indicating reaction of the water and cellulose (FIG. 9). The correlation between partial pressure and concentration for each species differ, so a relatively larger increase in the partial pressure of one species does not necessarily mean a larger increase in the molar flow rate of that species. Calibration of the MS device allowed to convert the partial pressure measurements to moles produced. After integrating the carbon monoxide and comparing it to the cellulose mass feed, the conversion of cellulose to CO was determined to be 92%. No carbon dioxide was detected in the outlet stream.

EXAMPLE 5

Gasification of Clippings of the Grass Poa pratensis

To demonstrate the gasification of biologically derived cellulose and lignin, grass clippings of the species Poa pratensis were gasified in an electrically heated aerosol transport tube reactor at a temperature of 1450 K. Sample preparation was as follows. 4 grams of clippings of the species Poa pratensis were rinsed in ethanol, and the rinsed clippings vacuum filtered. The residual clippings were dried for 24 hours in a vacuum furnace at 200° C. The dried material was ground with a mortar and pestle until there were no longer fibers longer than 1 mm in the sample. These clippings were loaded into a fluidized bed feeder.

The reactor apparatus the same as that in Example 1. The interior of the $Al_2O_3$ tube was sealed from the outer graphite element and purged with argon gas to eliminate oxygen. Particles of grass were placed in a fluidized bed feeder; fluidization gas (argon) entrained the particles, carrying them into the hot reactor, where they were combined with water vapor. The water flowrate was controlled by a syringe pump, and the water was introduced into the hot reactor environment through a capillary tube. The molar feed ratio of grass to water was approximately 1:1.

After leaving the heated portion of the reactor, the reaction products were passed through a gravity collection vessel and an HEPA filter (200 nm pore size). Large particles would be collected in the gravity vessel, with smaller, entrained particles accumulating on the HEPA filter. Gas analyses were performed using mass spectrometry and NDIR $CO/CO_2$ detection.

Figure 10:
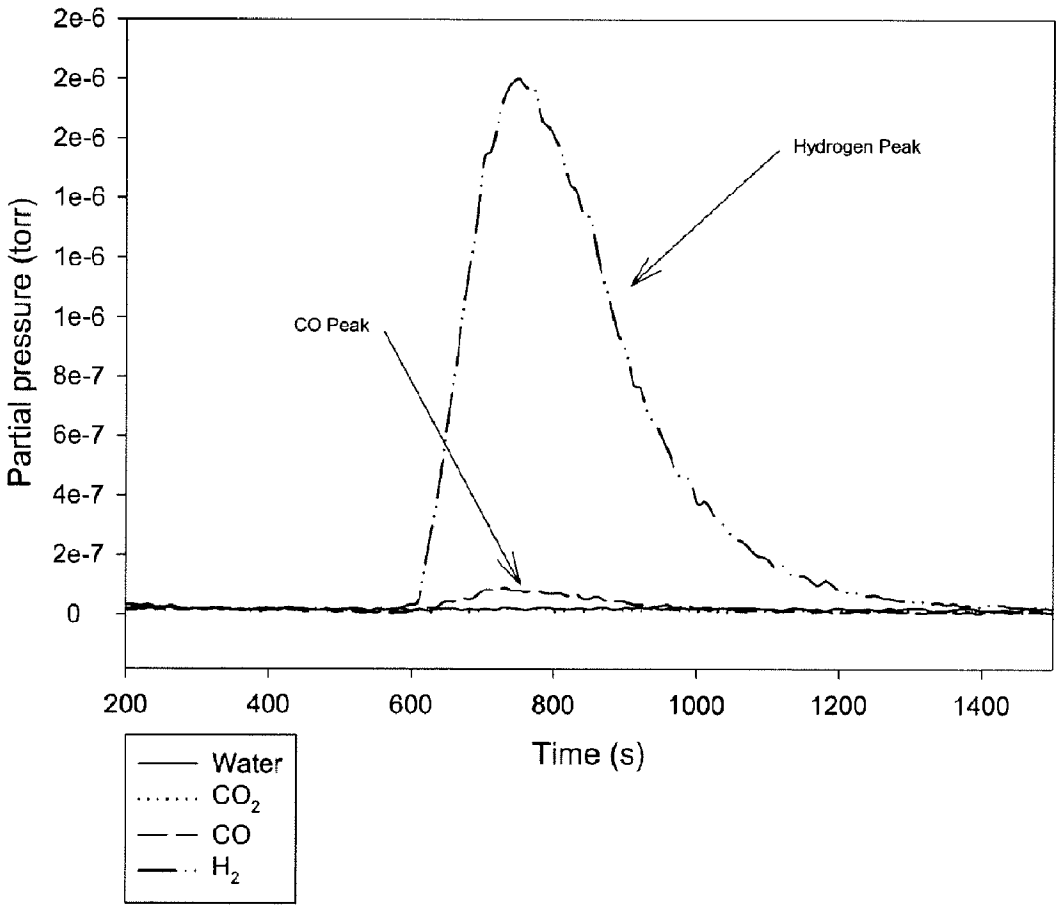
FIG. 10 is a mass spectrometer trace from gasification of grass clippings as performed in Example 5.

3.2 g of powder was fed into the reactor during the experiment. After the experiment, 0.28 g were collected in the gravity collection vessel, and 0.15 g were collected on the HEPA filter. This material was a fine black powder, and LECO C200 analysis confirmed it to consist of greater than 95% carbon. The mass spectrometer trace for the experiment is shown in FIG. 10. Less than 10% of the evolved gaseous carbon was as $CO_2$. Conversion to CO of the feed carbon was 64%, nearly all of the unconverted carbon existing as the fine black powder collected.

EXAMPLE 6

Hydrogen Production Using Zn as an Energy Storage Medium

Biomass particles are reacted with zinc oxide (ZnO) particles, using the solar thermal process described herein. Sunlight is used to drive the endothermic biomass pyrolysis (biomass to $CO/H_2/C$) and carbothermal reduction of ZnO (C, $CO+ZnO \rightarrow Zn+CO/CO2$) reactions. The reactor temperature can be between approximately 1400 and 2200 K. The reaction is extremely fast at the high temperatures achieved via solar-thermal heating. The primary pyrolysis/carbothermal reduction products are Zn metal, $H_2$, CO, and $CO_2$.

Figure 11:
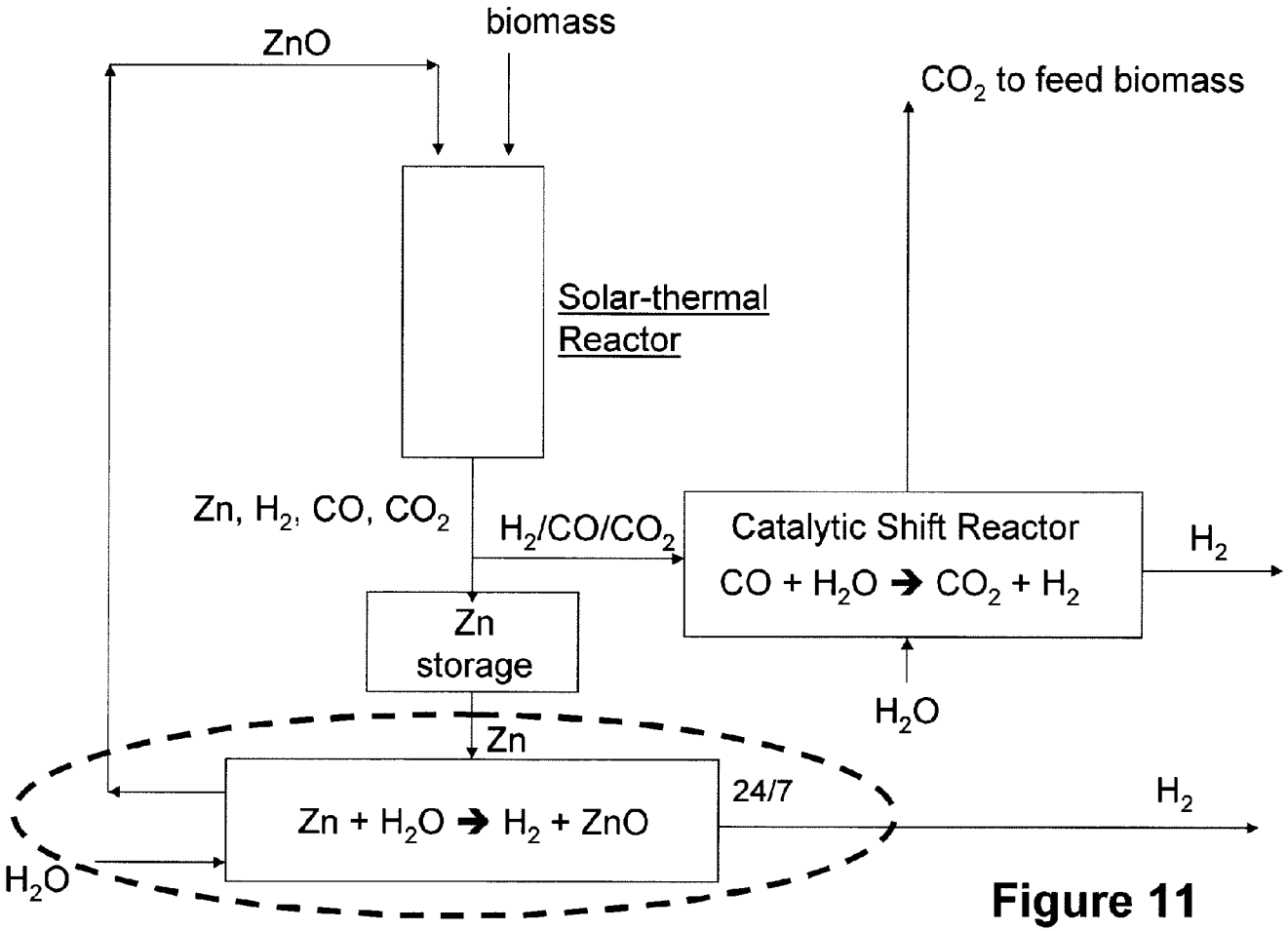
FIG. 11 is a schematic of a solar process for producing hydrogen. In this process, biomass pyrolysis occurs concurrently with carbothermic reduction of metal oxide particles in a solar thermal reactor. Hydrogen is obtained from the gaseous products of the reactor and from reaction of the reduced metal oxide with steam.

After cooling, the Zn metal is a solid and can be easily separated from the gaseous products and stored. The gaseous $H_2$, CO, $CO_2$ mixture can be fed to a conventional catalytic water gas shift reactor with water feed to carry out water gas shift ($CO+H_2O \rightarrow CO_2+H_2$) reaction producing $H_2$ and $CO_2$. The $H_2$ can be used as a fuel or chemical feedstock for another process. The $CO_2$ can be released to the atmosphere or fed to a greenhouse to grow biomass. The solar-thermal reactor process provides Zn metal to a Zn metal storage system and a water gas shift reactor feed at high rates on-sun. The Zn is effectively an energy storage medium. A secondary step in which the Zn is reacted at approximately 700 K with steam to produce $H_2$ and ZnO is an exothermic process, and can be operated autothermally. Hence, the Zn/steam reactor can be designed to operate at a rate consistent with the production of Zn on-sun (~⅓ to ¼ of the time) from the solar-thermal step (hence, the Zn/steam reactor will operate to react Zn at a rate of about ⅓ to ¼ of the rate at which Zn is being produced on-sun, since on-sun time is ⅓ to ¼ of the typical day). The Zn storage will increase during the daytime when the solar-thermal process is operating and will decrease during the evening when Zn is not being produced on-sun. The ZnO produced via the Zn/steam reaction step is recycled back to the solar-thermal reactor for on-sun reduction to produce Zn. The Zn/ZnO is a closed loop cycle. A schematic of this process is given in FIG. 11.

EXAMPLE 7

Combined Solar-Thermal Biomass/Zn Process with Coal Hydrogenation Process

Figure 12:
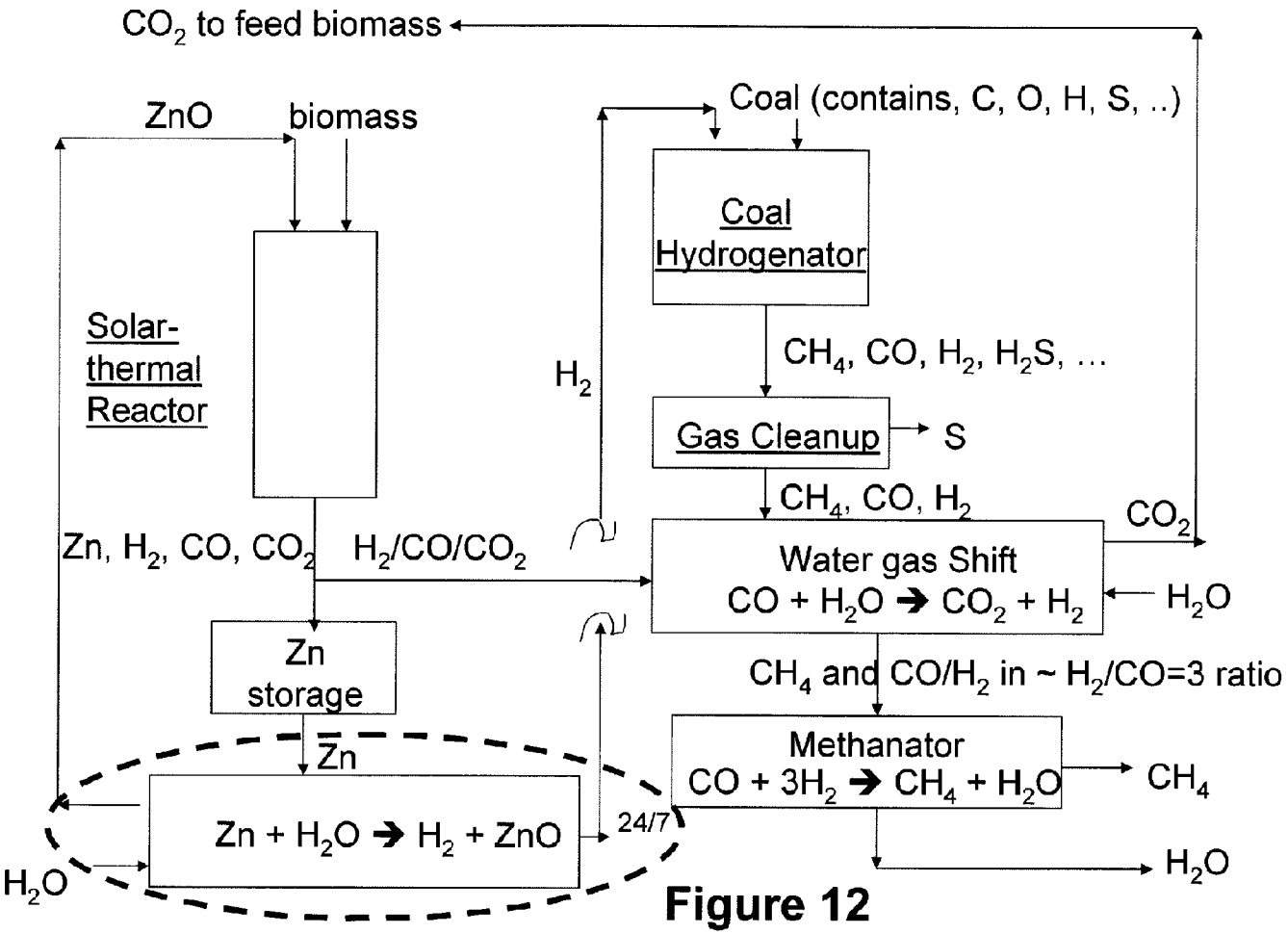
FIG. 12 is a schematic of a process for producing methane in which hydrogen produced via the process of FIG. 11 is fed into a coal hydrogenator.

A solar-thermal biomass/Zn process, producing renewable $H_2$, can be integrated with a conventional fossil feed process. Such a process represents a transitional bridge to a truly hydrogen economy. FIG. 12 illustrates a process to produce methane by reacting coal with renewable hydrogen. In this process, $H_2$ is supplied continuously via the Zn/steam reactor while the $H_2/CO/CO_2$ from the on-sun solar-thermal reactor is supplied to a continuous water gas shift reactor, downstream of the coal hydrogenation reactor. The resulting product is $CH_4$ out of a methanator. The renewable $H_2$ to the process is supplied via pyrolyzed biomass from solar-thermal pyrolysis and water from the Zn/steam reactor. The carbon to the process is supplied by the coal and the biomass. The coal hydrogenator should be operated at high pressure of ~1,000 psig or greater. The hydrogen from the Zn/steam reactor can be supplied at the required delivery pressure in the reactor or may require compression.

EXAMPLE 8

Figure 13:
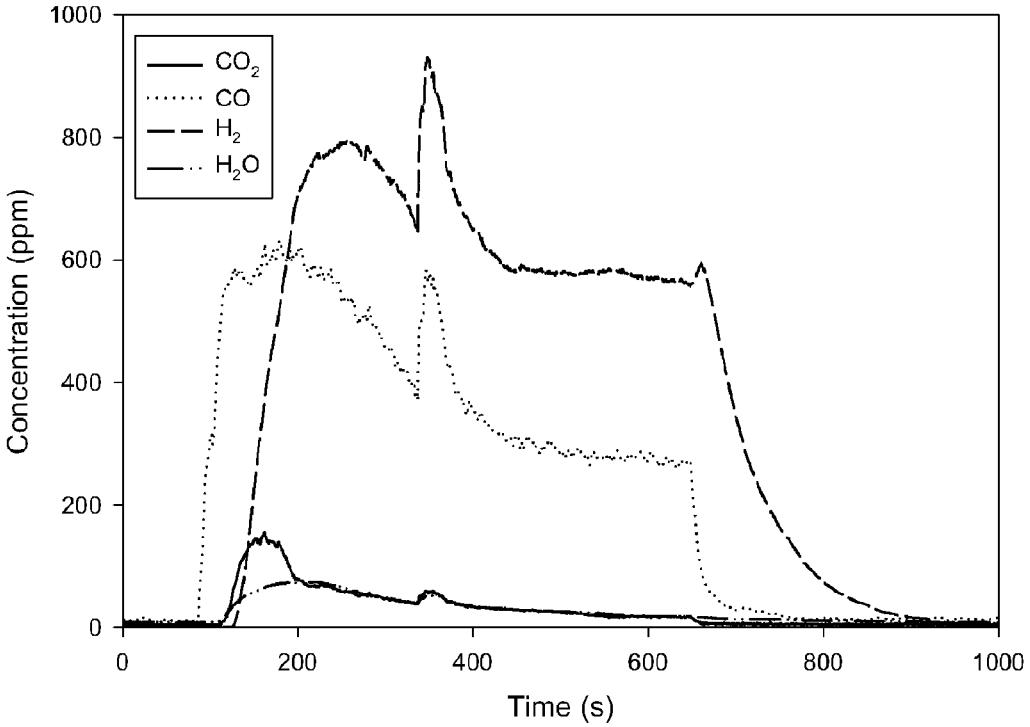
FIG. 13 is a mass spectrometer trace for TGA $Fe_3O_4$ reduction.
Figure 14:
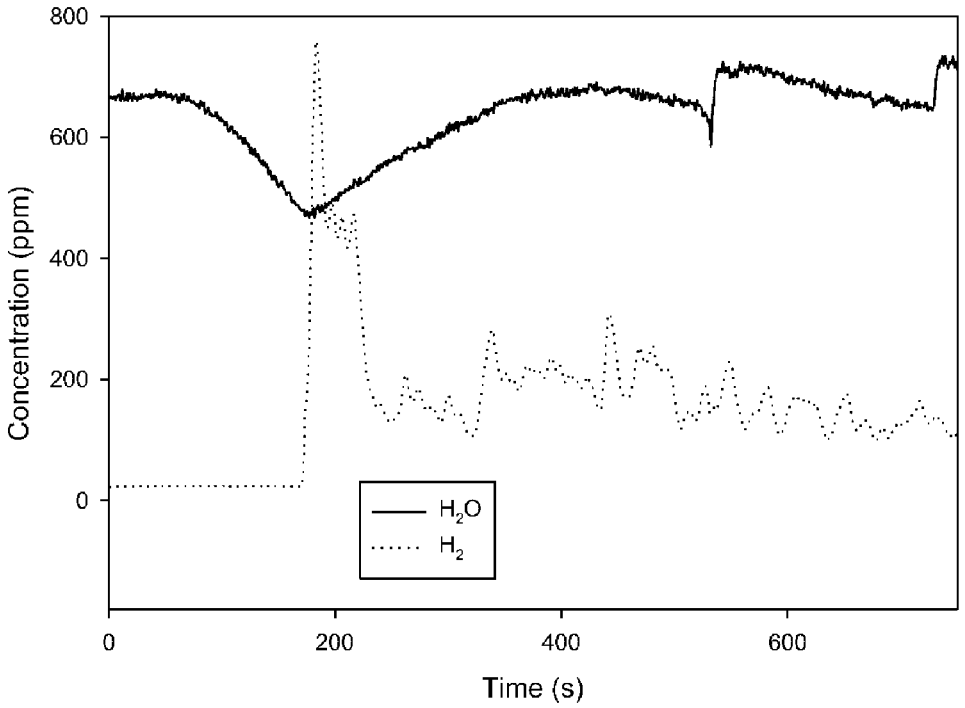
FIG. 14 is a mass spectrometer trace for TGA steam oxidation of FeO.

Reduction of $Fe_3O_4$ by CO and $H_2$ and Generation of $H_2$ by Reaction of Water with the Reduced Products To demonstrate the feasibility of $Fe_3O_4$ reduction by the products of biomass gasification, $Fe_3O_4$ was loaded in a platinum crucible in a thermogravimetric analyzer (TGA). The system was heated to 1000° C. under 200 sccm of argon gas flow. At 1000° C., the temperature was held constant while 22.5 sccm of $H_2$ and 22.5 sccm of CO were introduced into the system. The mass of the sample decreased, indicating a reduction reaction; the change in mass was commensurate with that for complete reduction to FeO. The gas products were analyzed using mass spectrometry, and the trace for this analysis is shown in FIG. 13. As can be seen, both $CO_2$ and $H_2O$ were produced by reaction, indicating reduction by both CO and $H_2$. In a second experiment, the iron oxide reduced in the first experiment remained in the Pt crucible while water was introduced at 400° C. The mass of the sample increased, with a total level commensurate with re-oxidation of the FeO to $Fe_3O_4$. Gases were analyzed using mass spectrometry. As can be seen in FIG. 14, hydrogen was produced during a corresponding dip in the water concentration. These experiments demonstrate the viability of cycling iron oxide through reduction and oxidation steps for energy storage and hydrogen generation.

We claim:

1. A method for at least partially reacting biomass particles to form reaction products comprising hydrogen and carbon monoxide, the method comprising the steps of:

a) providing a solar-thermal reactor comprising an outer protection shell and one or more inner reaction shells having an inlet and an outlet, the outer protection shell having an opening to the atmosphere for transmission of solar energy;

b) flowing a gas stream from the inlet to the outlet of the reaction shell, the gas stream comprising entrained biomass particles at the inlet of the one or more inner reaction shells, the volume average equivalent spherical particle diameter of the biomass particles being between 10 micron and 10 mm; and c) rapidly heating the biomass particles in the reactor through solar thermal heating to a temperature of at least 950° C. at least in part by exposing the reactor to a source of concentrated sunlight, wherein the biomass particles react to form products comprising hydrogen and carbon monoxide, wherein the temperature of at least 950° C. is used to at least bypass formation of tar, where the ash content of the biomass particles [exiting] *entering* the solar-thermal reactor is less than 15% and conversion of the non-ash components of the biomass particles is greater than 50%.

2. The method of claim 1, wherein the biomass particles are heated to a temperature from 1000° C. to 1400° C. and the rate at which the biomass particles are heated is greater than 100° C./s.

3. The method of claim 1 wherein the residence time of the biomass particles in the portion of the reactor exposed to the source of concentrated sunlight is less than or equal to 5 sec and the flux of the source of concentrated sunlight is from 1000 kW/m2 to 3000 kW/m2.

4. The method of claim 1, wherein the maximum equivalent spherical particle diameter of the biomass particles is less than 1 millimeter.

5. The method of claim 4, wherein the conversion of the non-ash components of the biomass particles is greater than 70% and the gas stream also comprises water vapor and the molar ratio of water to biomass particles is greater than or equal to one.

6. The method of claim 1, wherein the biomass particles react to form products comprising hydrogen, carbon monoxide, and carbon dioxide and the ratio of carbon dioxide to carbon monoxide is less than 25%.

7. The method of claim 1, further comprising:

flowing the gas stream with the biomass particles along with metal oxide particles at the inlet of the one or more inner reaction shells and the biomass particles and gas stream do not comprise substantial amounts of water; and heating the biomass and metal oxide particles in the reactor through solar thermal heating at least in part by the exposing the reactor to the source of concentrated sunlight, the particles being heated to the temperature of at least 950° C. at which the biomass particles pyrolyze to form reaction products comprising hydrogen, carbon, and carbon monoxide and the metal oxide particles react with at least one of the biomass pyrolysis reaction products to form a reduced metal oxide product which is a metal, a metal oxide of a lower valence state, or a combination thereof.

8. The method of claim 7, wherein the biomass particles are heated to a temperature from 1000° C. to 1400° C. and the metal oxide particles are selected from the group consisting of zinc oxide (ZnO), tin oxide ($SnO_2$), or iron oxide ($Fe_3O_4$).

9. The method of claim 7, wherein the conversion of the metal oxide to a reduced metal or to a lower oxidation state metal oxide is at least 50% and the residence time of the particles in the portion of the reactor exposed to the source of concentrated sunlight is less than 5 sec.

10. The method of claim 7, wherein the conversion of metal oxide to a reduced metal or to a lower oxidation state metal is at least 75% and the volume average equivalent spherical particle diameter of the biomass particles is between 10 micron and 10 mm and the particle size of the metal oxide particles is below 150 microns.

11. The method of claim 1, wherein a window or aperture in a side wall of the outer protection shell and the side wall does not permit transmission of solar radiation except at the window or aperture in the side wall, where at least a portion of an interior of the side wall, away from the window or aperture, comprises a material reflective to solar radiation, and in a cross-section of the reactor made through the window or aperture in the side wall and perpendicular to the longitudinal axis of the outer protective shell, the outer protective shell is characterized by a horizontal centerline which extends through the window or aperture, wherein at least three inner shells at least partially located within the outer protection shell, each inner shell having a longitudinal axis parallel to the longitudinal axis of the outer protection shell, wherein the inner shells are not concentric and are arranged so that the side walls of the inner shells are not in contact with each other and so that in the reactor cross-section, the centers of the inner shells are not aligned along a single straight line, and wherein a particle entrainment feeding system in fluid communication with the inner shells, wherein the source of concentrated solar radiation is disposed so that the window or aperture of the outer protection shell is exposed to solar radiation.

12. The method of claim 11, wherein a number of inner reaction shells is from 3 to 10 and in the reactor cross-section the centers of the inner reaction shells are aligned along a circular arc and a center of the arc lies on the horizontal centerline and is located farther back in the outer shell than the ends of the arc.

13. The method of claim 11, wherein a number of inner reaction shells is from 3 to 10 and in the reactor cross-section the centers of the inner shells are arranged in a staggered pattern.

14. The method of claim 11, wherein the inner reaction shells are arranged in two rows perpendicular to a horizontal centerline, the first row containing more inner reaction shells and spanning a greater width than the second row and the second row being located farther back in the outer shell than the first row, and wherein a number of inner reaction shells is greater than 5, and a ratio of a length to an inner diameter of the inner shells is from 2 to 12.

15. A method for at least partially reacting biomass particles to form reaction products comprising hydrogen and carbon monoxide, the method comprising the steps of:

a) providing a solar-thermal reactor comprising an outer protection shell and an inner reaction shell having an inlet and an outlet, the outer protection shell having an opening to the atmosphere for transmission of available concentrated solar energy;

b) flowing a gas stream from the inlet to the outlet of the reaction shell, the gas stream comprising entrained biomass particles at the inlet of the reaction shell, the volume average equivalent spherical particle diameter of the biomass particles having a defined range;

c) rapidly heating the biomass particles in the reactor through solar thermal heating to a temperature of at least 950° C. at least in part by exposing the reactor to a source of concentrated sunlight, wherein the biomass particles react in a gasification reaction to form products comprising hydrogen and carbon monoxide; and d) balancing the biomass particles gasification reaction with the available concentrated solar energy, biomass particles size within the boundaries of the defined range, operating temperature of the reactor, residence time that the biomass particles remain in the solar-thermal reactor so that overall biomass conversion remains above a threshold percentage and gasification of the biomass particles occurs at a temperature where tar formation is negligible, wherein the heating to the temperature of at least 950° C. is used to cause the tar formation to be negligible, where the ash content of the biomass particles [exiting] *entering* the solar-thermal reactor is less than 15% and conversion of the non-ash components of the biomass particles is greater than 50%.

* * * * *